United States Patent
Holleran et al.

(10) Patent No.: US 11,454,128 B2
(45) Date of Patent: Sep. 27, 2022

(54) FAIRING ASSEMBLY

(71) Applicant: General Electric Company, Schenectady, NY (US)

(72) Inventors: Mark Anthony Holleran, Cincinnati, OH (US); Matthew Mark Weaver, Loveland, OH (US); Darrell Glenn Senile, Oxford, OH (US); Nicholas John Bloom, Maineville, OH (US)

(73) Assignee: General Electric Company, Schenectady, NY (US)

( * ) Notice: Subject to any disclaimer, the term of this patent is extended or adjusted under 35 U.S.C. 154(b) by 862 days.

(21) Appl. No.: 16/055,646

(22) Filed: Aug. 6, 2018

(65) Prior Publication Data

US 2020/0040749 A1 Feb. 6, 2020

(51) Int. Cl.
*F01D 9/04* (2006.01)
*F01D 25/24* (2006.01)
(Continued)

(52) U.S. Cl.
CPC ............ *F01D 9/047* (2013.01); *F01D 11/005* (2013.01); *F01D 25/243* (2013.01);
(Continued)

(58) Field of Classification Search
CPC ...... F01D 9/047; F01D 25/246; F01D 25/243; F01D 25/28; F01D 11/005;
(Continued)

(56) References Cited

U.S. PATENT DOCUMENTS 4,710,097 A * 12/1987 Tinti ..................... F01D 25/246
                                                    415/138
5,272,869 A * 12/1993 Dawson ................. F01D 9/042
                                                    415/142
(Continued)

FOREIGN PATENT DOCUMENTS

FR         23887615 B1       8/2007

OTHER PUBLICATIONS

U.S. Appl. No. 15/922,263, filed Mar. 15, 2018.
Chinese Office Action Corresponding to Application No. 201910721501 dated Apr. 26, 2022.

*Primary Examiner* — Justin D Seabe
*Assistant Examiner* — Adam W Brown
(74) *Attorney, Agent, or Firm* — Dority & Manning, P.A.

(57) ABSTRACT

Fairing assemblies and methods for assembling gas turbine engine fairing assemblies are provided. For example, a fairing assembly comprises a plurality of fairings, an annular inner band defining a plurality of inner pockets, and an annular outer band defining a plurality of outer pockets. Each fairing has an inner end radially spaced apart from an outer end. Each inner pocket is shaped complementary to each fairing inner end and has forward and aft ends. Each outer pocket is shaped complementary to each fairing outer end and has forward and aft ends. The inner and outer bands are each a single piece structure. Each fairing inner end is received within one of the plurality of inner pockets, and each fairing outer end is received within one of the plurality of outer pockets. Some embodiments also comprise an inner ring positioned against the inner band to close the inner pockets.

23 Claims, 26 Drawing Sheets

(51) Int. Cl.
*F01D 25/28* (2006.01)
*F01D 11/00* (2006.01)

(52) U.S. Cl.
CPC ........... *F01D 25/246* (2013.01); *F01D 25/28* (2013.01); *F05D 2230/60* (2013.01); *F05D 2240/11* (2013.01); *F05D 2240/128* (2013.01); *F05D 2240/14* (2013.01); *F05D 2300/6033* (2013.01)

(58) Field of Classification Search
CPC ......... F05D 2240/14; F05D 2300/6033; F05D 2230/60; F05D 2240/11; F05D 2240/128
See application file for complete search history.

(56) References Cited

U.S. PATENT DOCUMENTS

| | | | | |
|---|---|---|---|---|
| 5,357,744 A * | 10/1994 | Czachor | ................ | F01D 9/065 415/134 |
| 5,421,703 A * | 6/1995 | Payling | ................ | F01D 9/042 415/209.3 |
| 5,797,725 A * | 8/1998 | Rhodes | ................ | B23P 6/005 415/209.2 |
| 6,464,456 B2 * | 10/2002 | Darolia | ................ | F01D 5/3084 415/134 |
| 6,648,597 B1 * | 11/2003 | Widrig | ................ | C04B 37/001 415/200 |
| 7,565,796 B2 * | 7/2009 | Eleftheriou | ........... | F01D 25/162 60/226.1 |
| 8,152,451 B2 | 4/2012 | Manteiga et al. | | |
| 8,172,526 B2 * | 5/2012 | Lescure | ................ | F01D 11/005 415/213.1 |
| 8,226,360 B2 * | 7/2012 | Scoggins | ................ | F01D 9/041 415/191 |
| 8,292,580 B2 * | 10/2012 | Schiavo | ................ | F01D 5/189 416/96 A |
| 8,371,812 B2 | 2/2013 | Manteiga et al. | | |
| 8,500,394 B2 * | 8/2013 | Major | ................ | F01D 17/162 415/160 |
| 8,801,381 B2 * | 8/2014 | Simon-Delgado | ...... | F01D 9/042 416/193 A |
| 9,206,742 B2 | 12/2015 | Chuong et al. | | |
| 9,212,566 B2 * | 12/2015 | Ryczek | ................ | F01D 9/04 |
| 9,297,312 B2 | 3/2016 | Chuong et al. | | |
| 9,631,517 B2 * | 4/2017 | Liles | ................ | F01D 9/04 |
| 9,664,066 B2 * | 5/2017 | Deane | ................ | F01D 25/243 |
| 9,771,818 B2 | 9/2017 | Budnick et al. | | |
| 9,784,133 B2 * | 10/2017 | Karafillis | ................ | F01D 9/042 |
| 9,828,867 B2 | 11/2017 | Budnick | | |
| 9,951,692 B2 | 4/2018 | Aronsson et al. | | |
| 10,294,819 B2 * | 5/2019 | Budnick | ................ | F01D 25/24 |
| 10,330,011 B2 * | 6/2019 | Chuong | ................ | F02C 7/20 |
| 2011/0081239 A1 * | 4/2011 | Durocher | ................ | F01D 9/044 415/208.2 |
| 2011/0081240 A1 * | 4/2011 | Durocher | ................ | F01D 9/044 415/209.3 |
| 2011/0302929 A1 * | 12/2011 | Bruhwiler | ................ | F01D 9/044 60/796 |
| 2014/0178187 A1 * | 6/2014 | Sakekar | ................ | F01D 9/041 415/185 |
| 2014/0212284 A1 * | 7/2014 | Jamison | ................ | F01D 9/042 415/208.2 |
| 2015/0330249 A1 | 11/2015 | Budnick | | |
| 2015/0337687 A1 * | 11/2015 | Scott | ................ | F01D 5/142 415/215.1 |
| 2015/0354410 A1 | 12/2015 | Budnick et al. | | |
| 2016/0281517 A1 * | 9/2016 | Kim | ................ | F01D 9/065 |
| 2016/0290168 A1 | 10/2016 | Karafillis et al. | | |
| 2016/0312658 A1 | 10/2016 | Heitman et al. | | |
| 2017/0241291 A1 | 8/2017 | Boeck | | |

\* cited by examiner

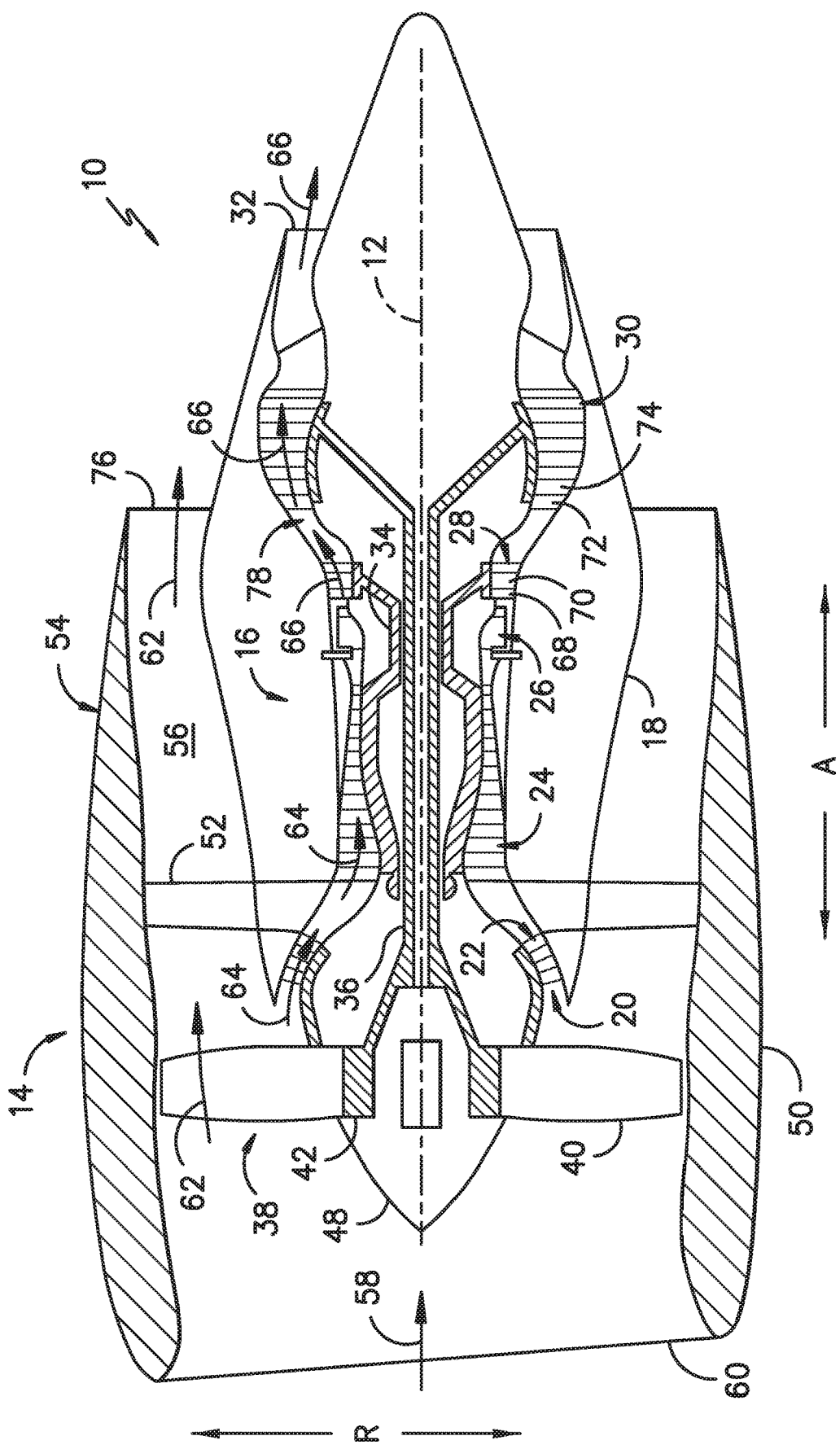
FIG. -1-

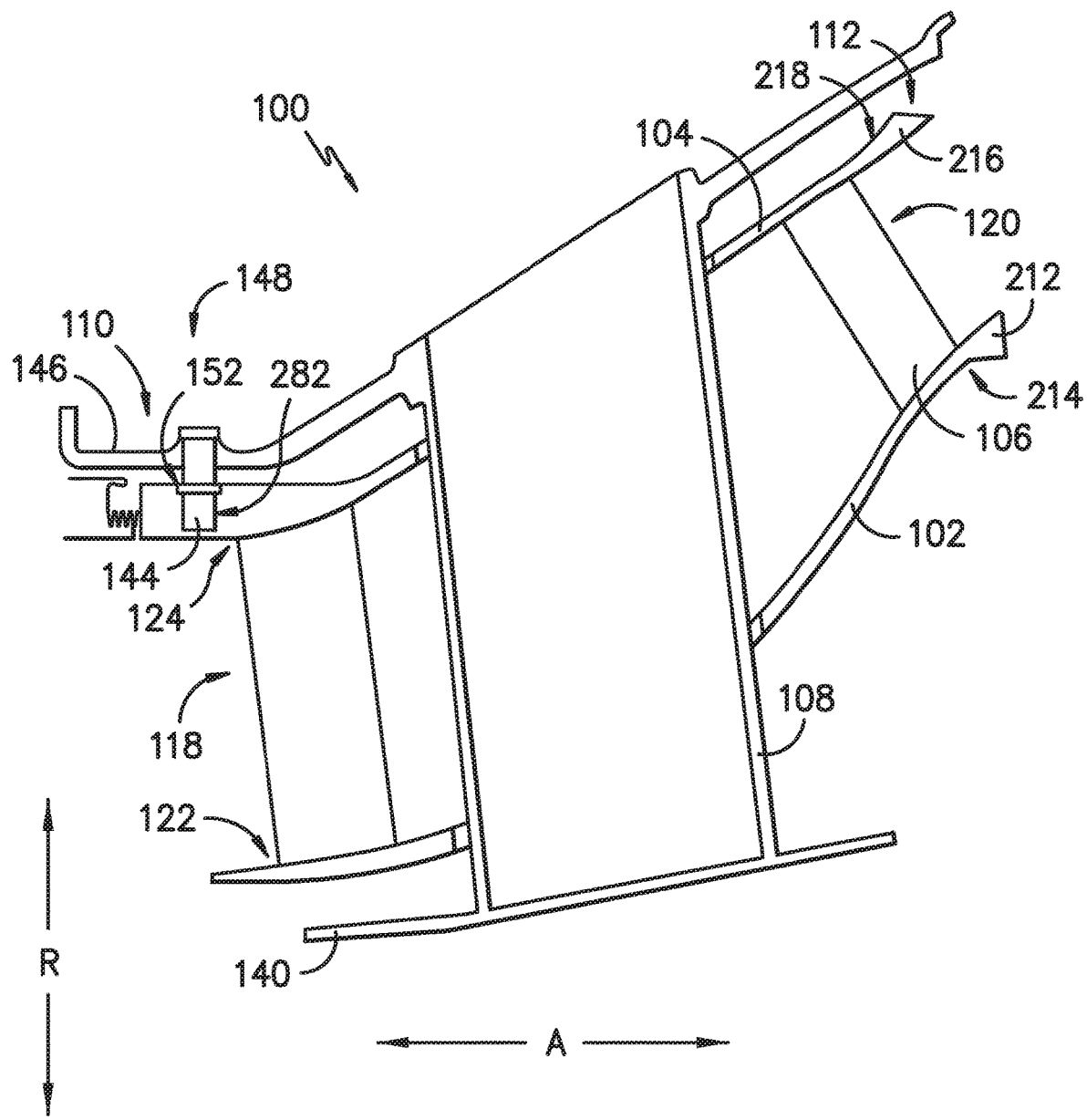
FIG. -2A-

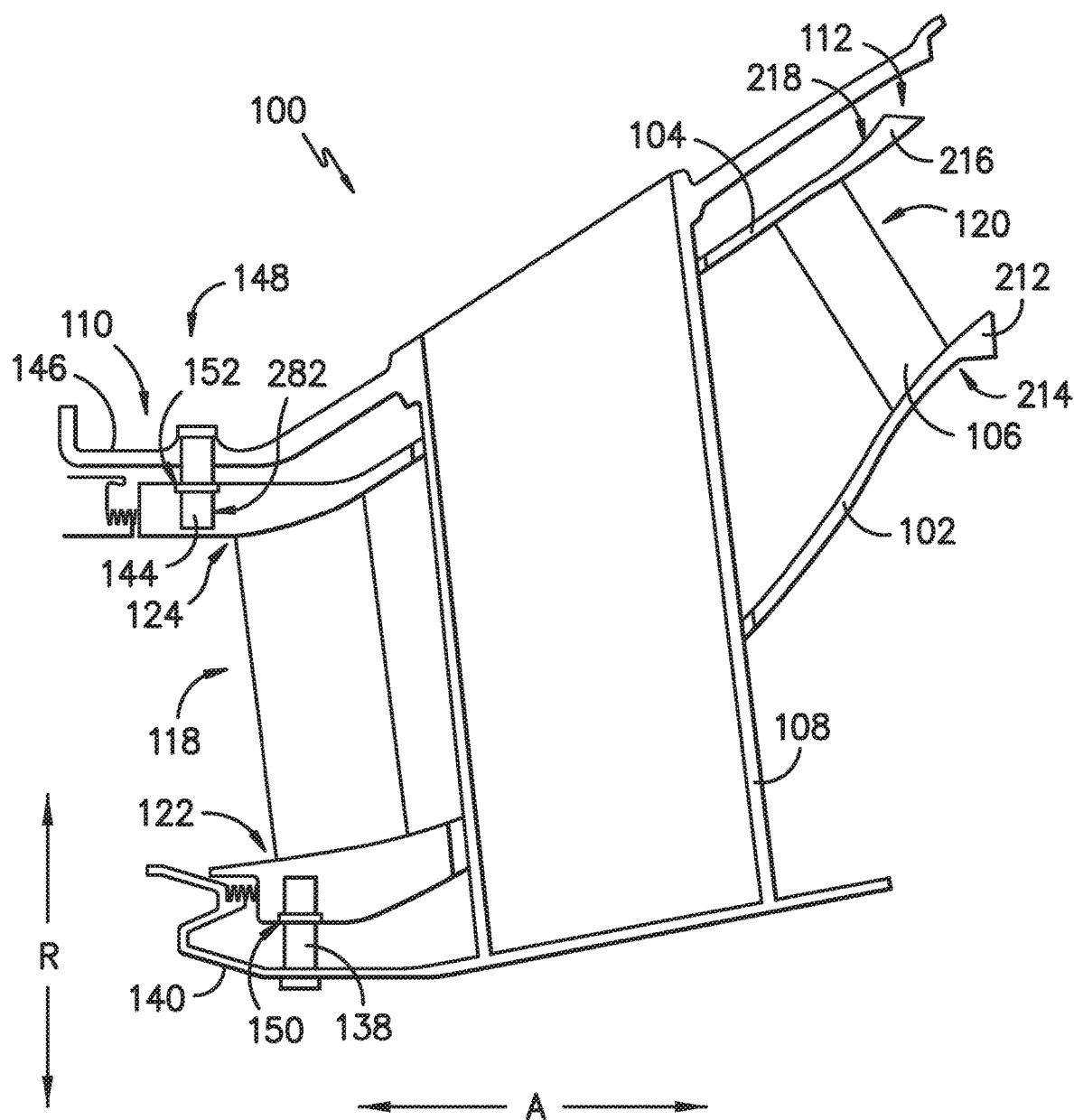
FIG. -2B-

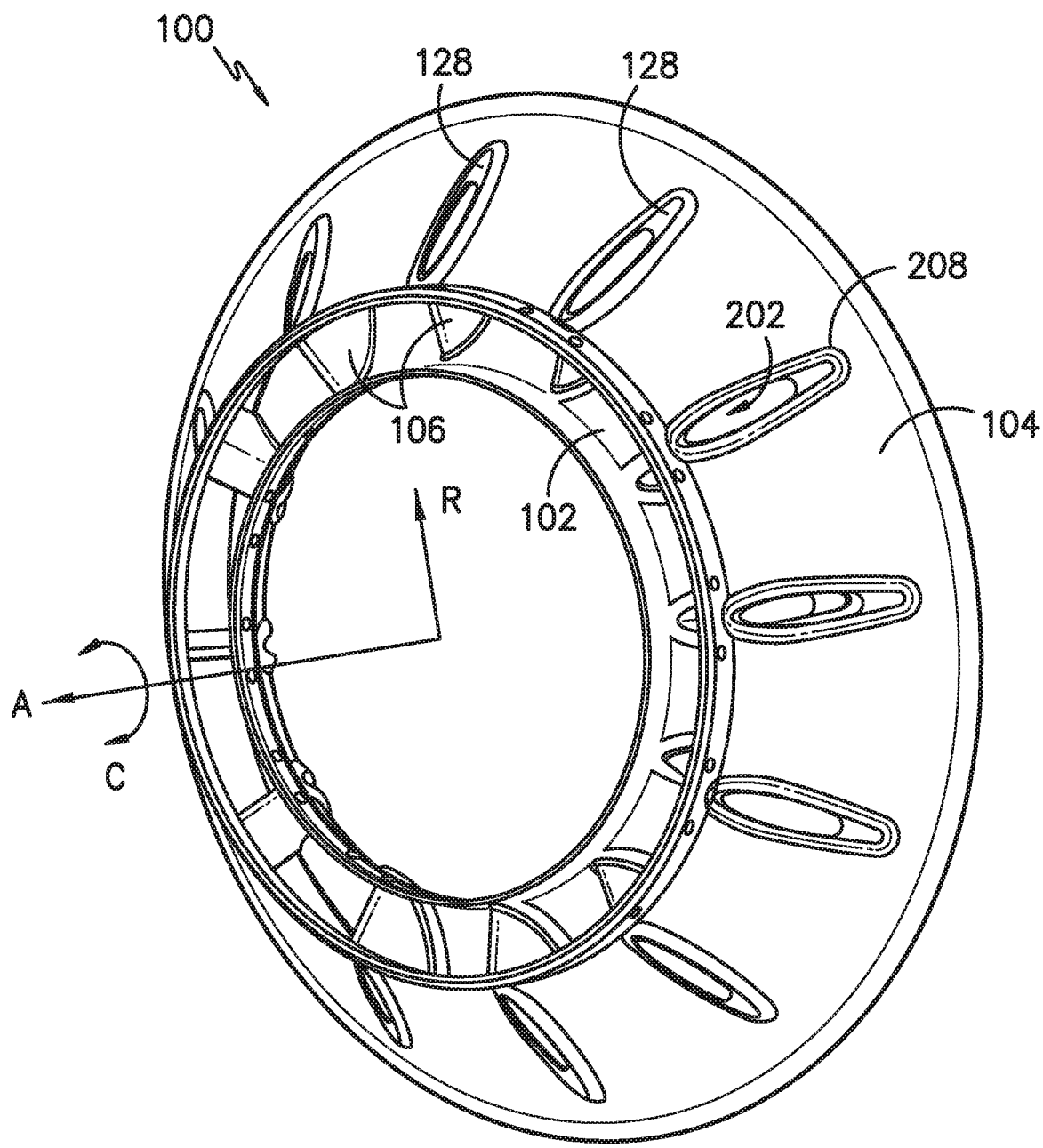
FIG. -3-

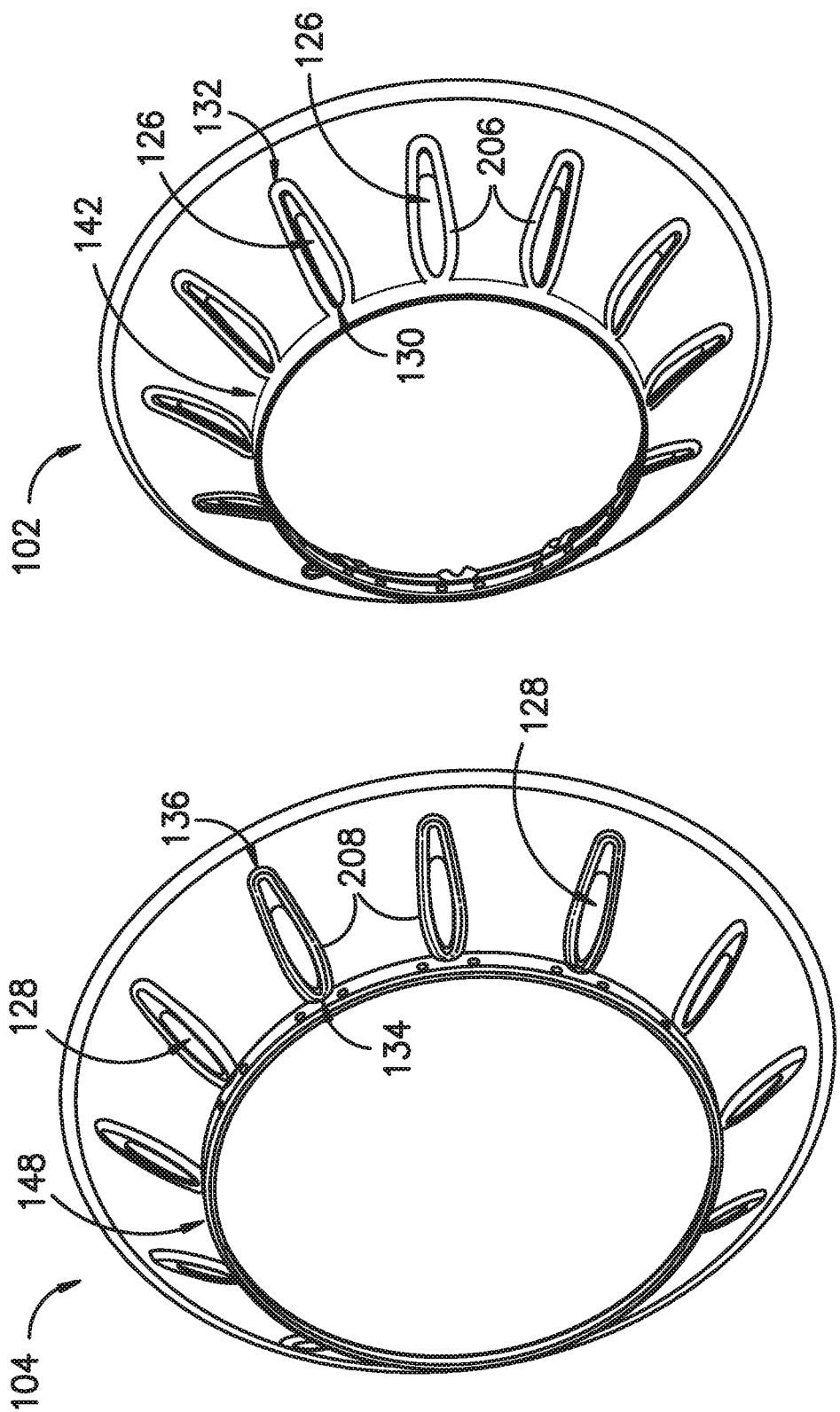
FIG. -4-

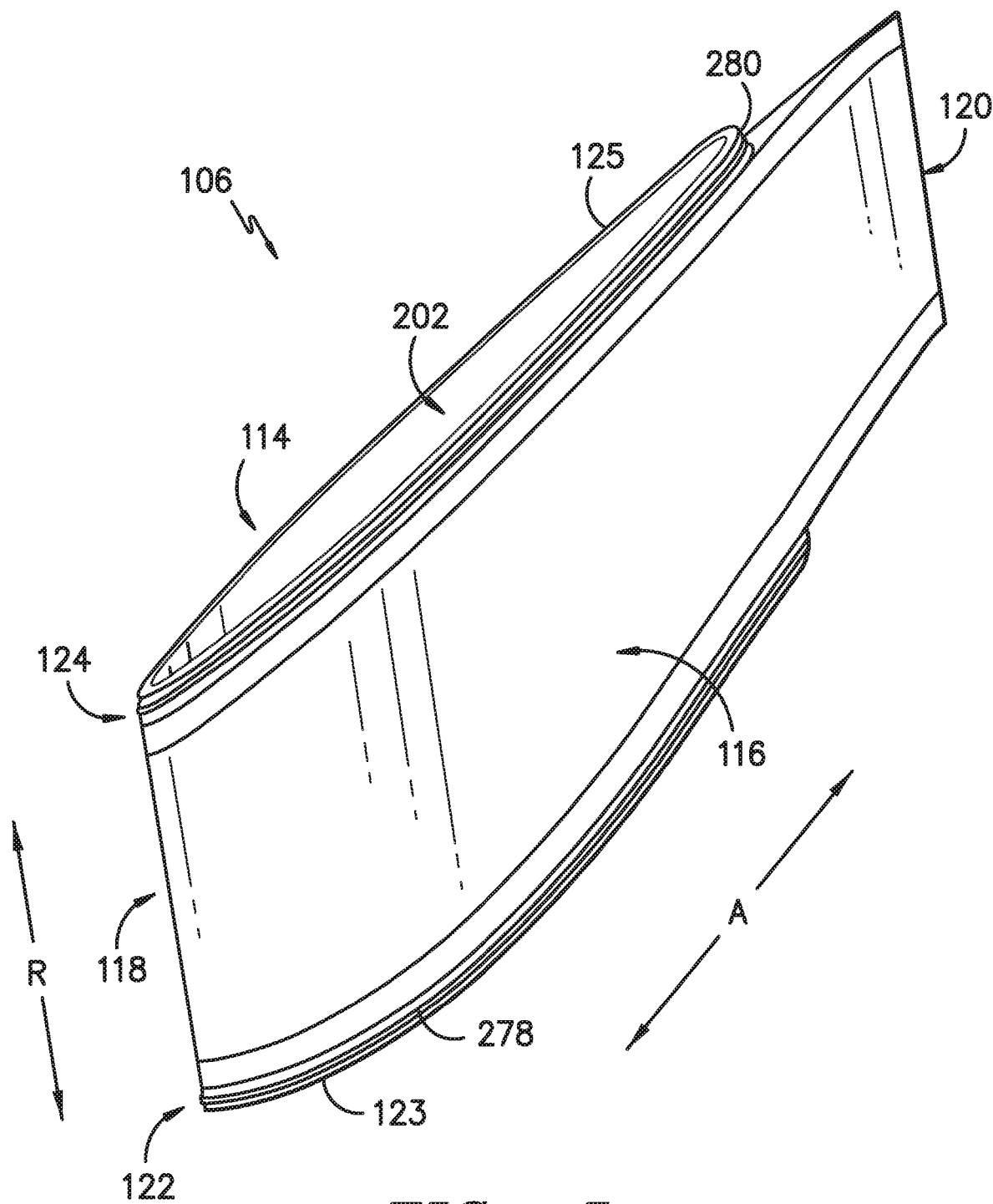
FIG. -5-

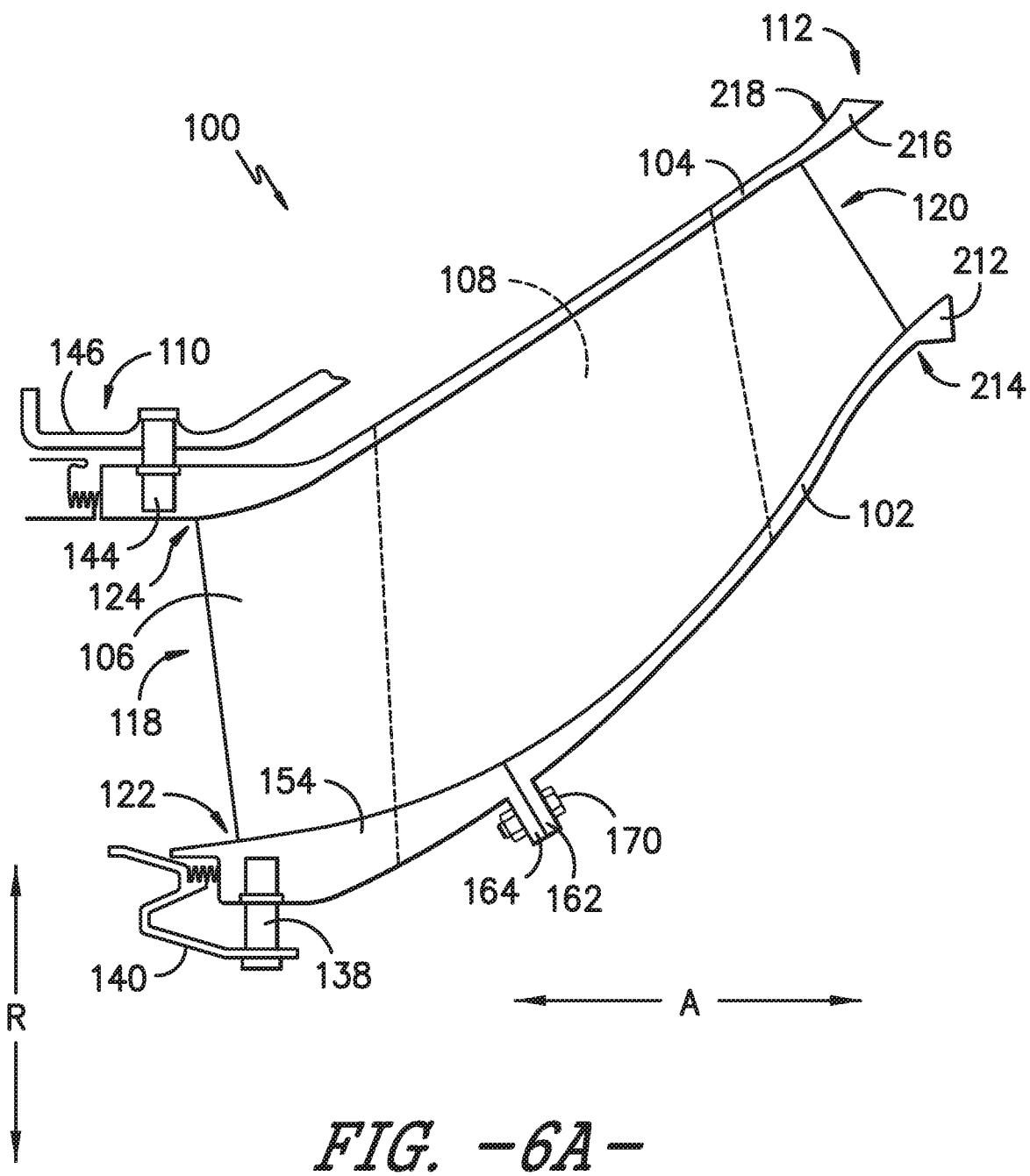
FIG. -6A-

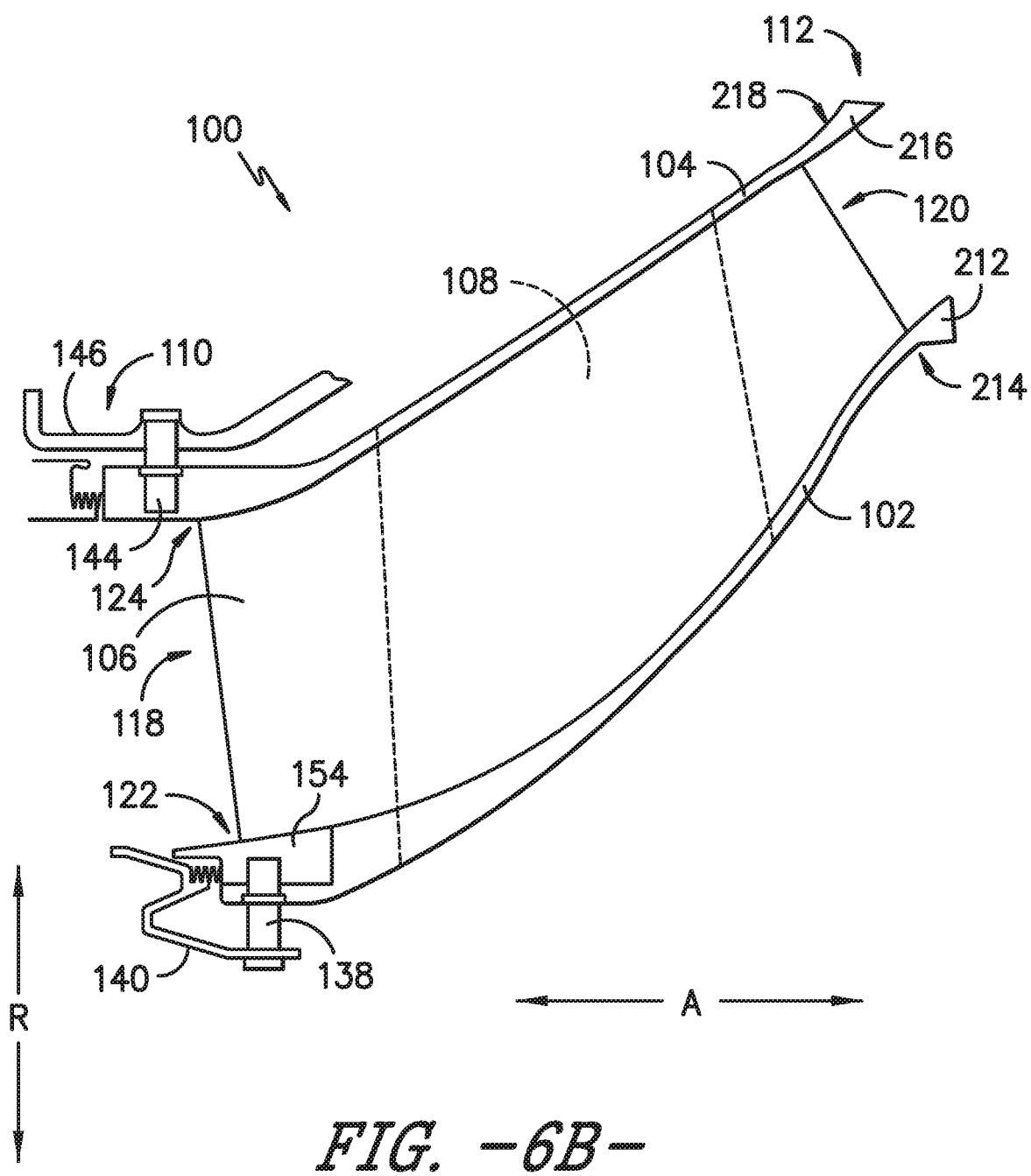
FIG. -6B-

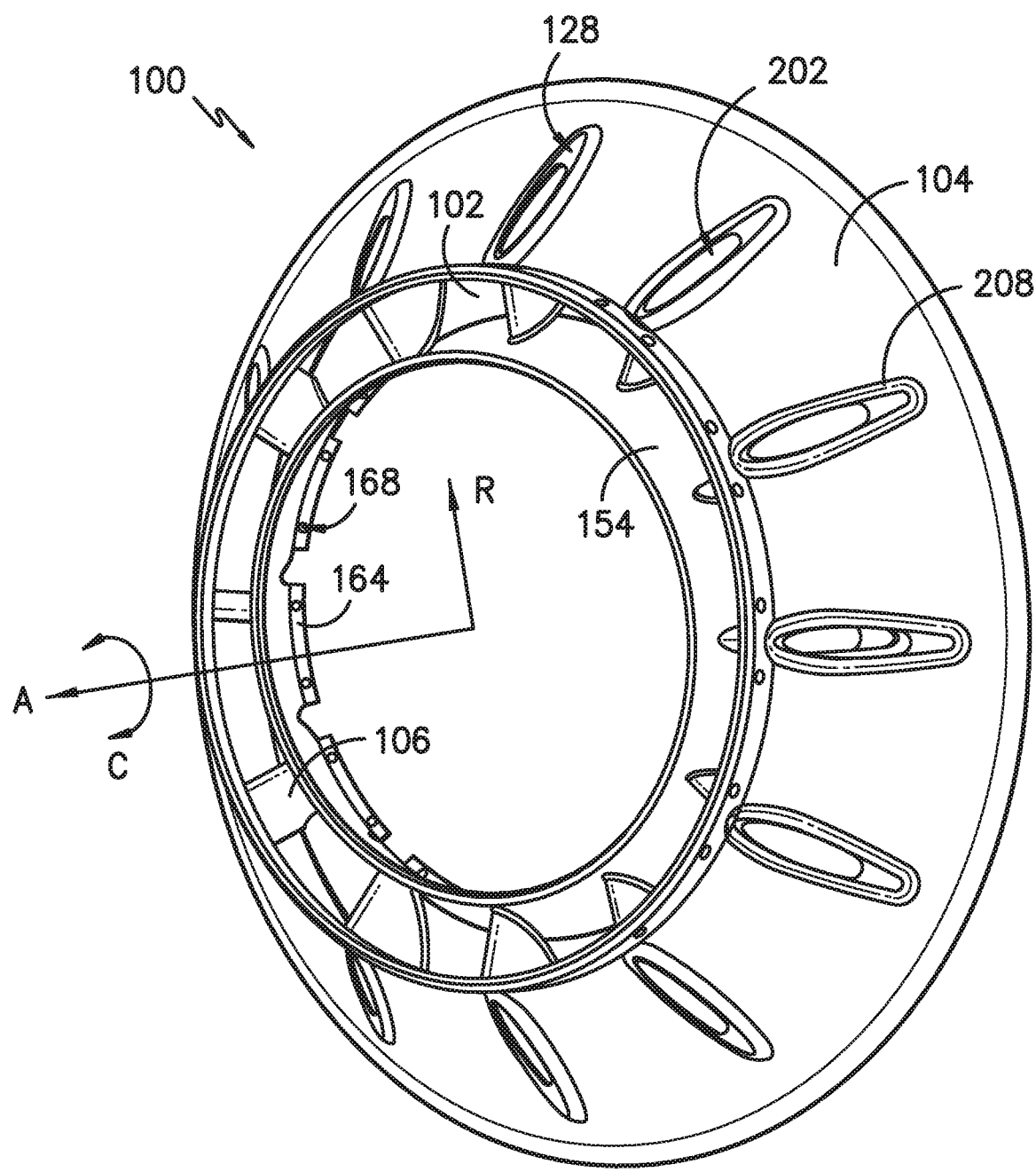
FIG. -7-

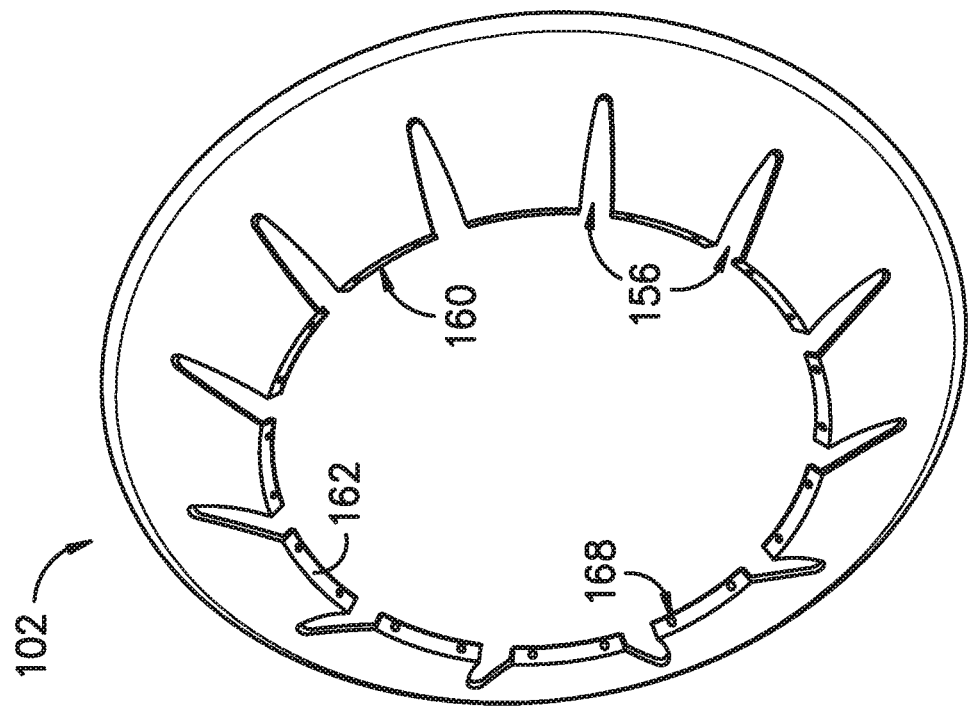
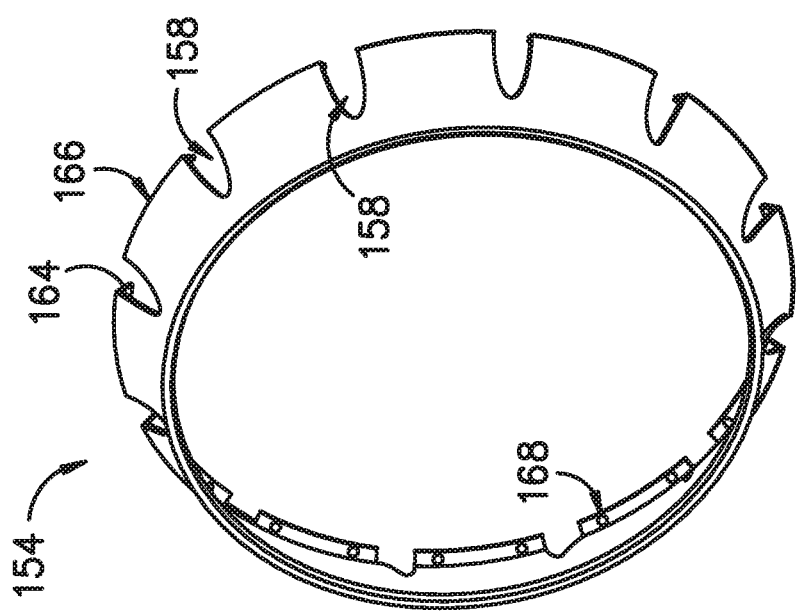
FIG. -8-

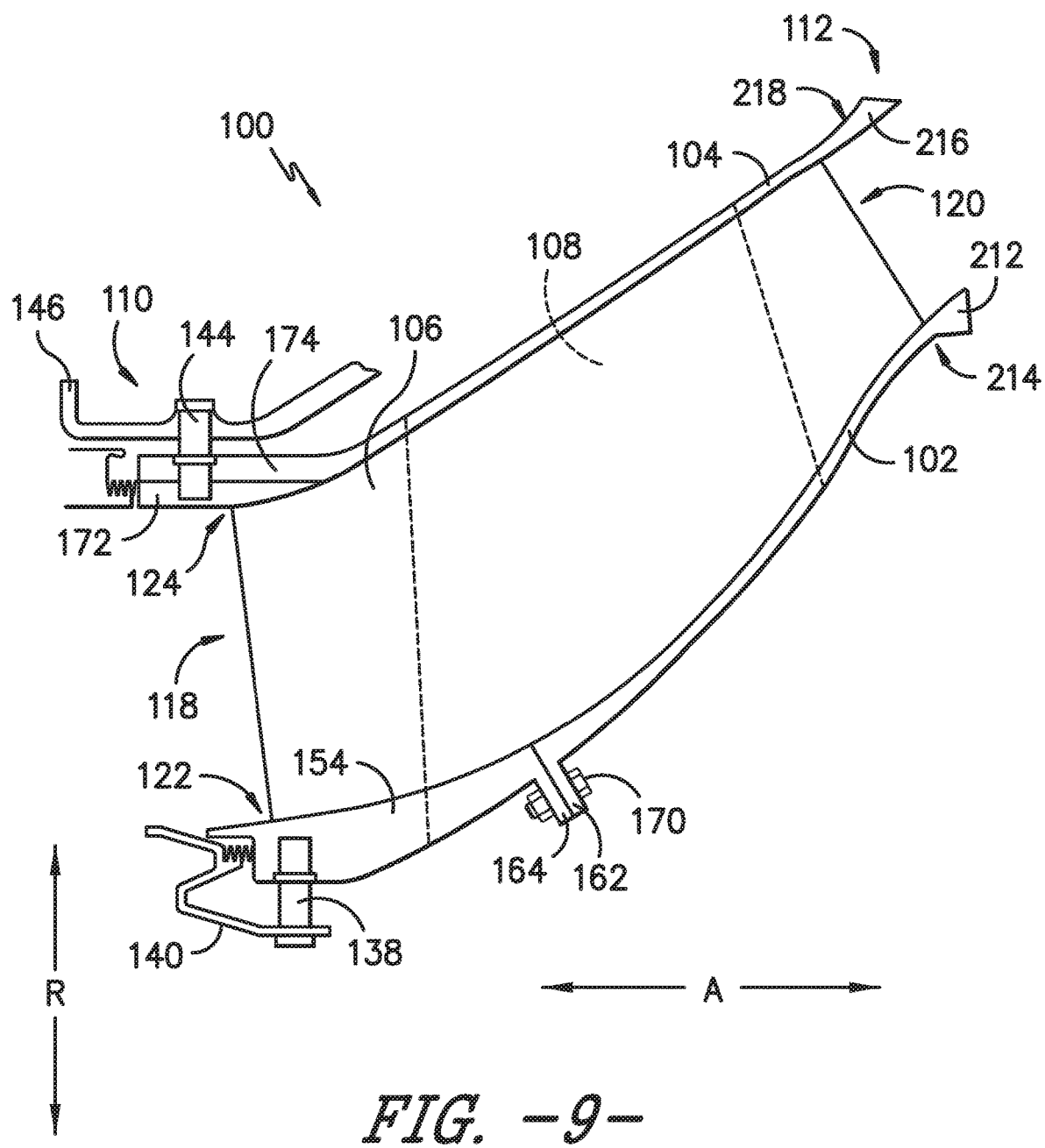
FIG. -9-

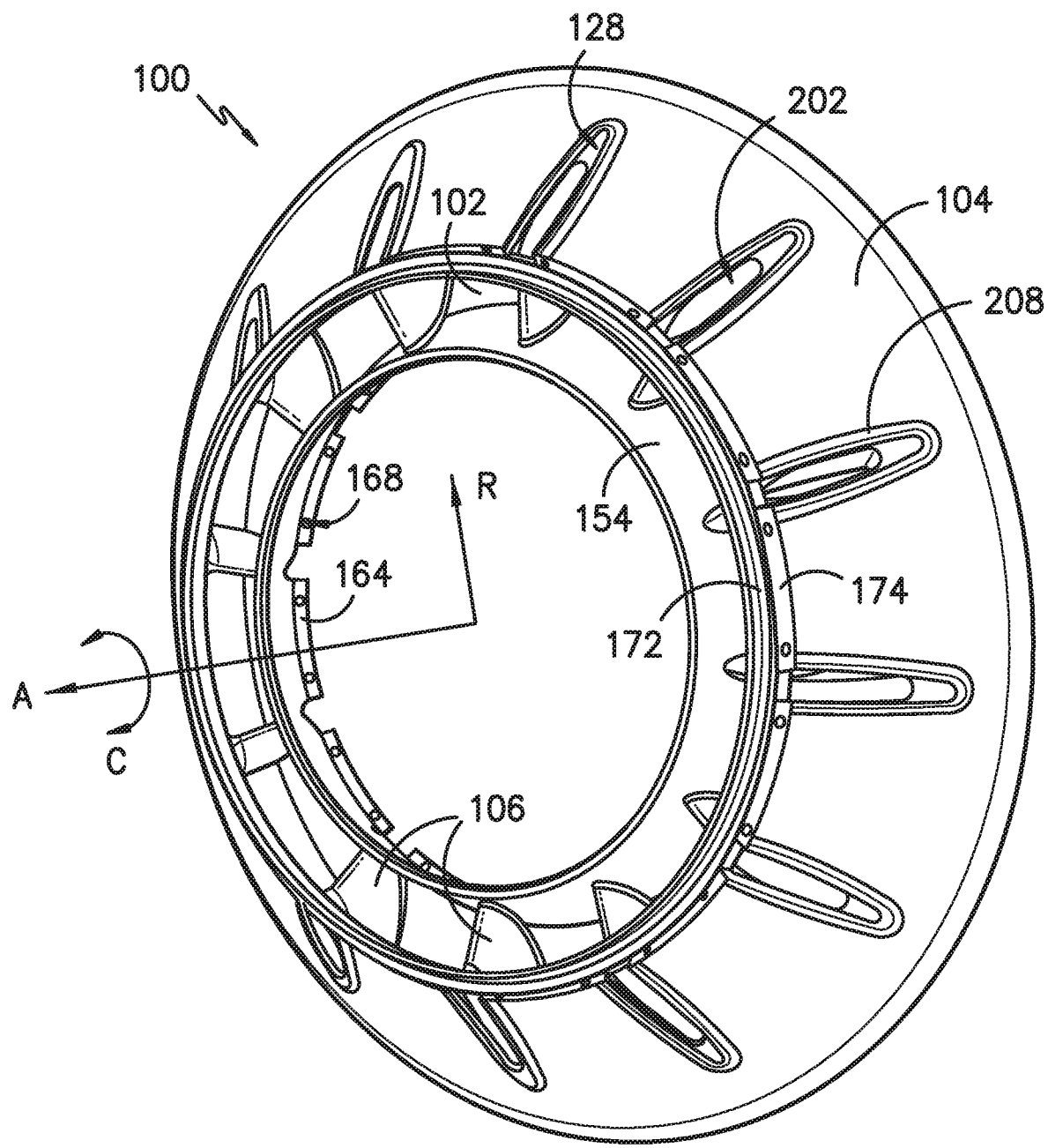
FIG. -10-

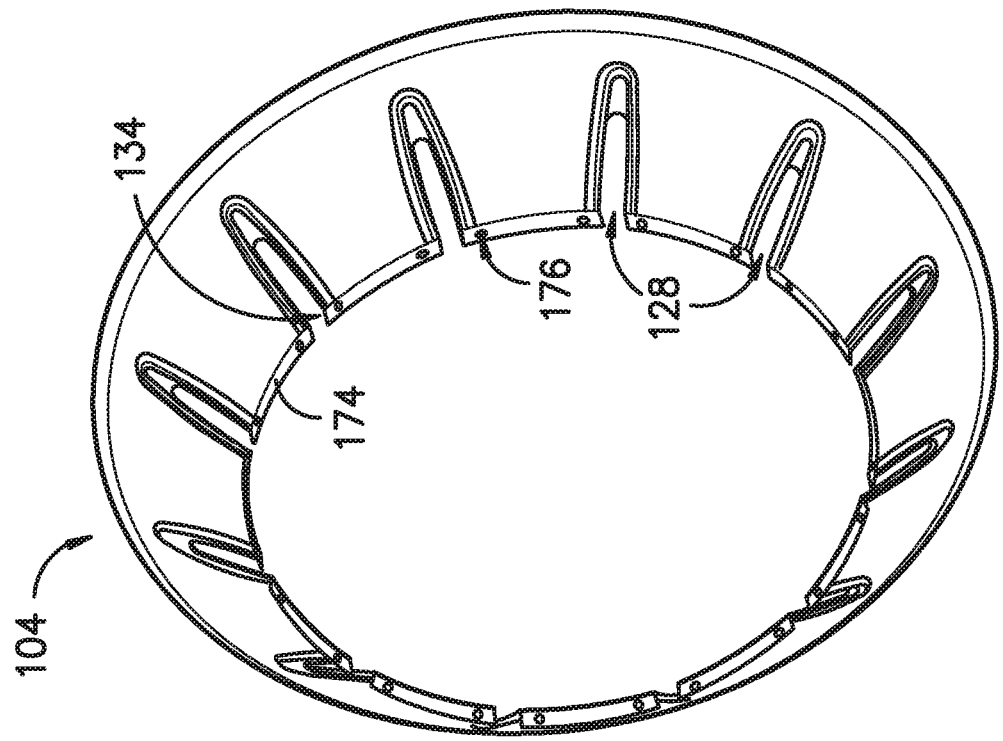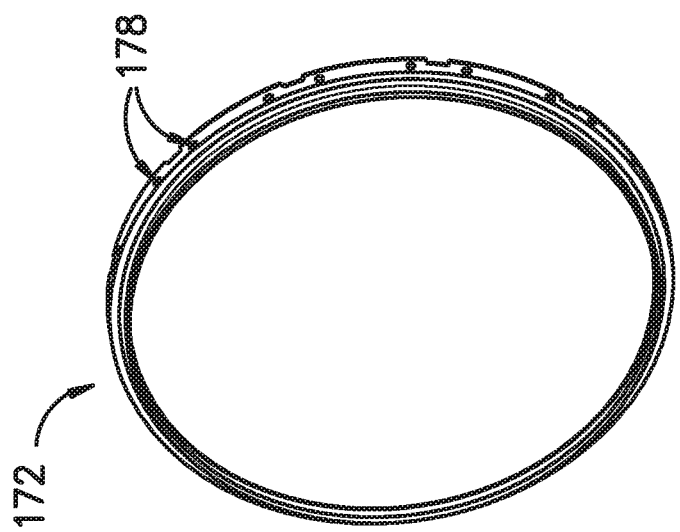
FIG. -11-

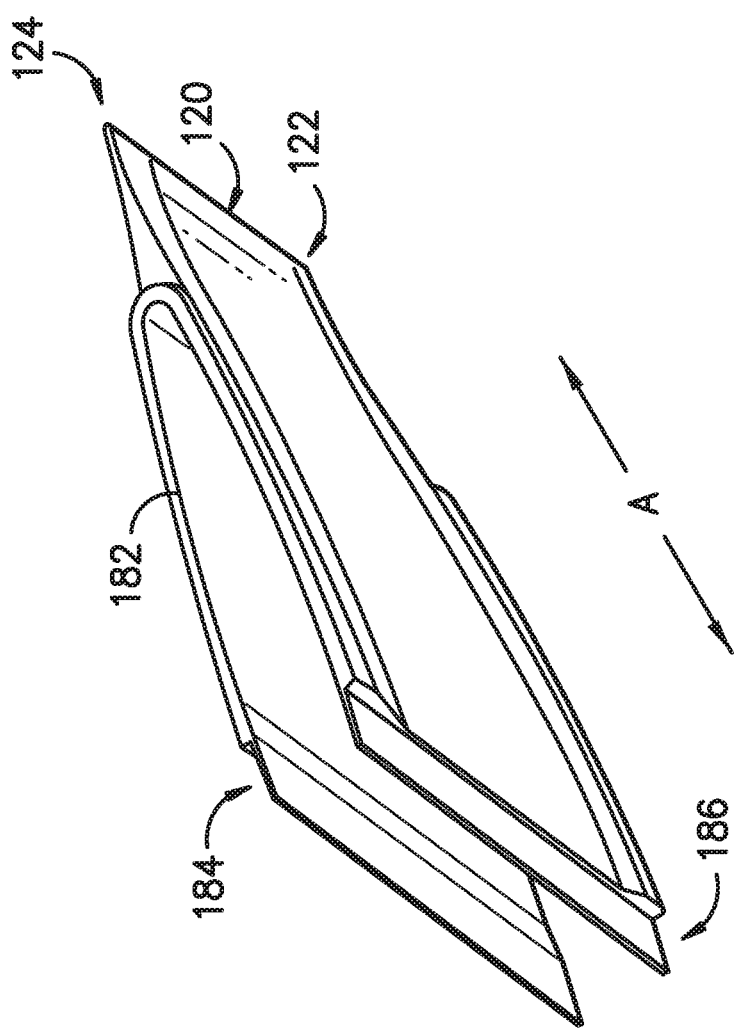
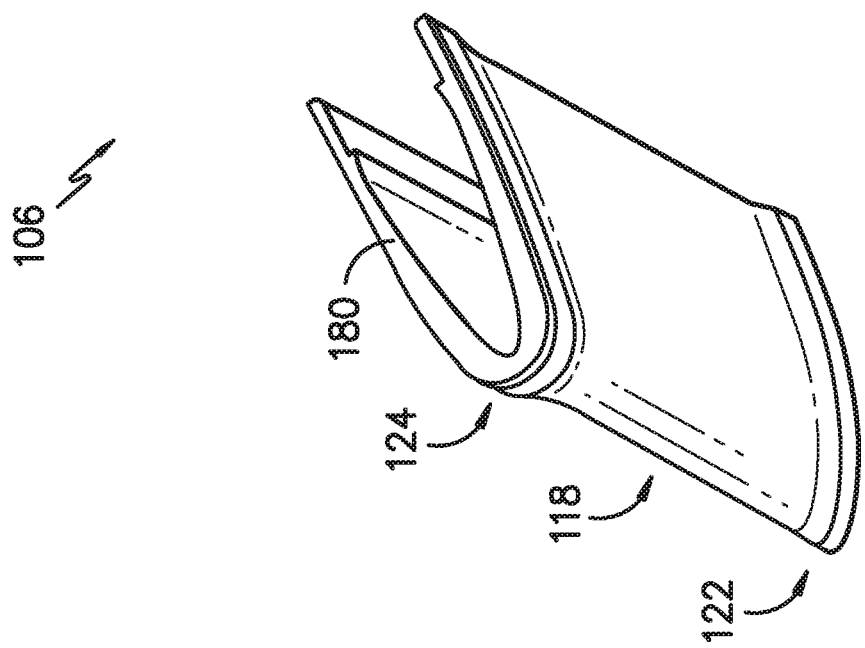
FIG. -12-

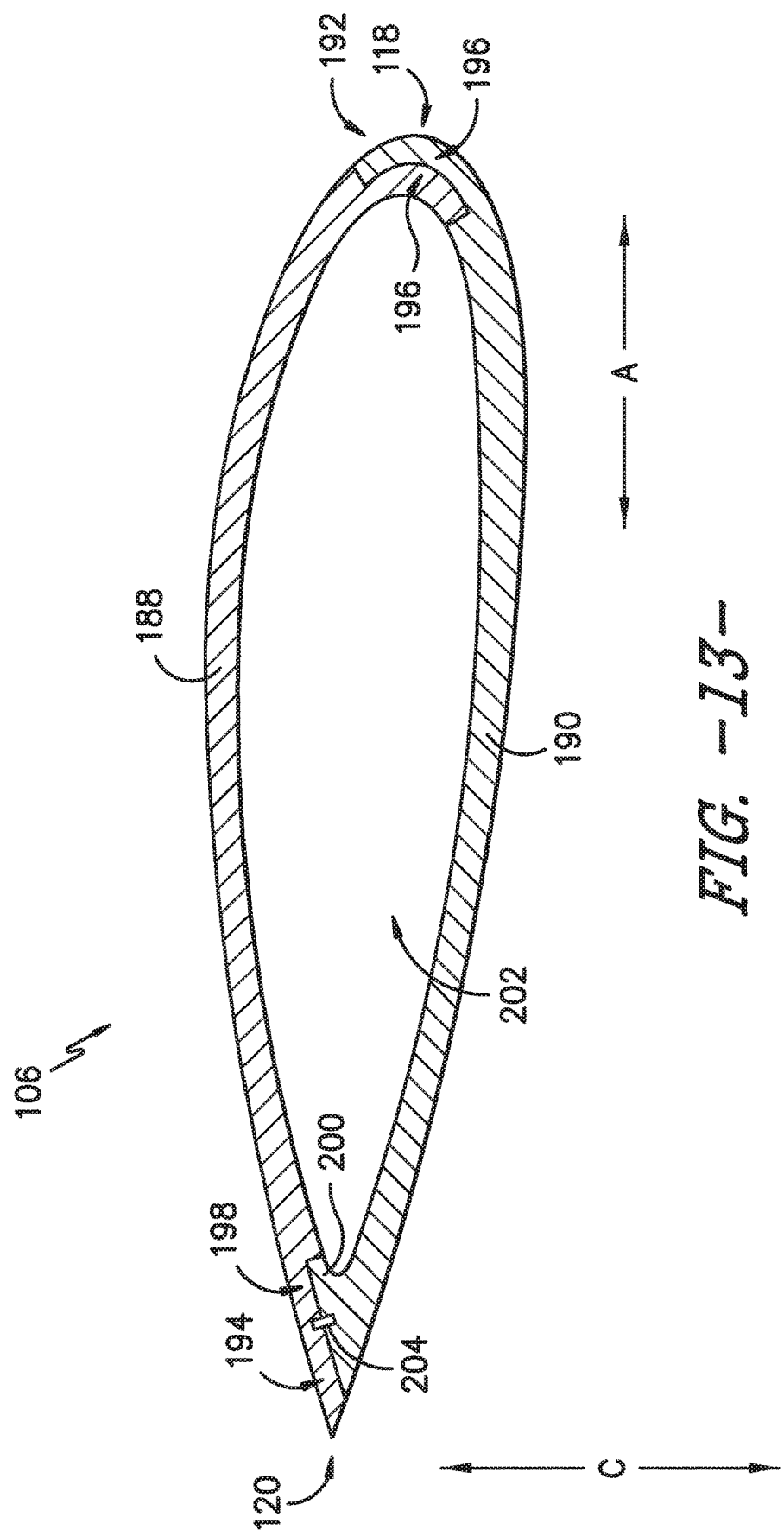

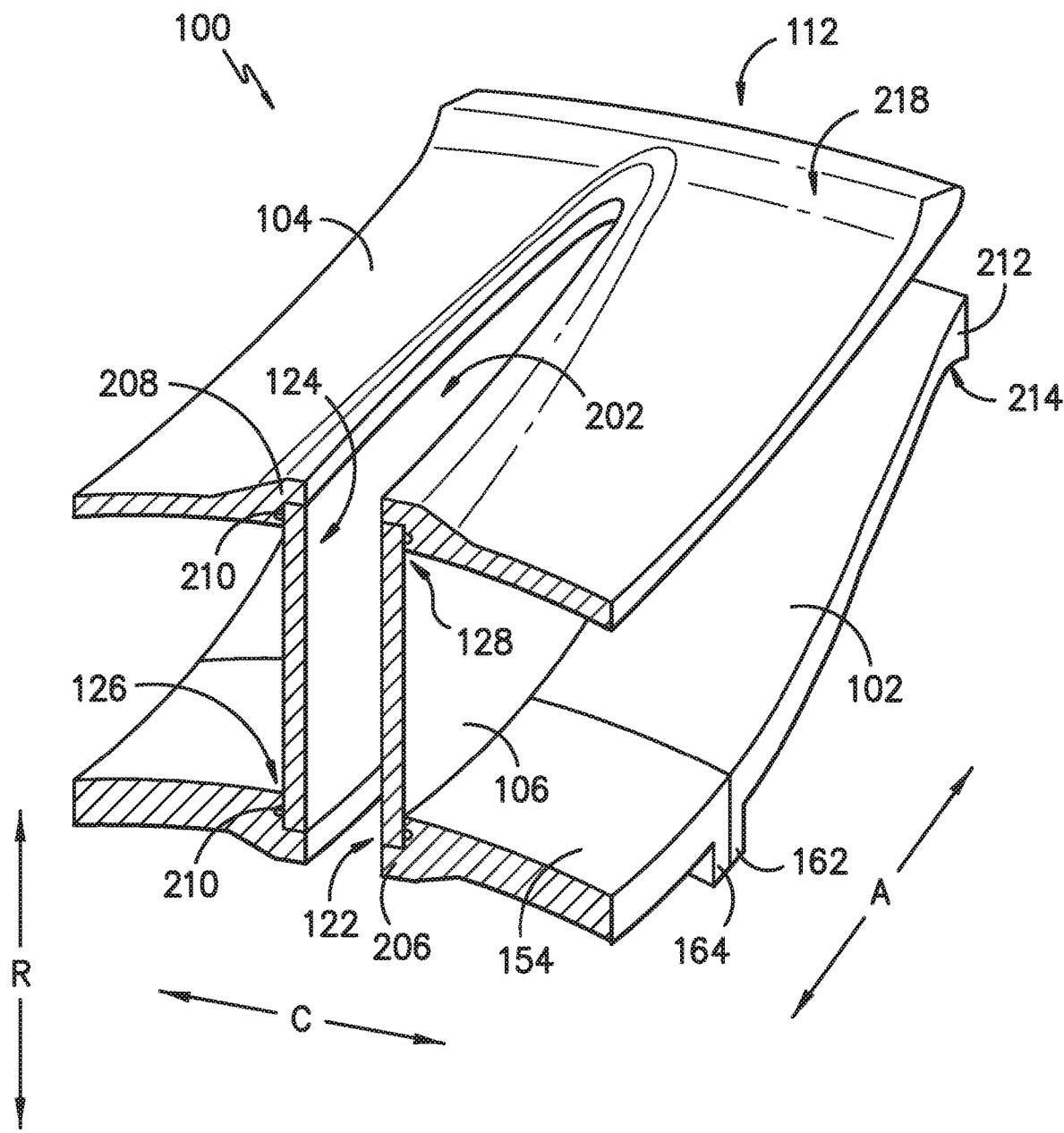
FIG. -14-

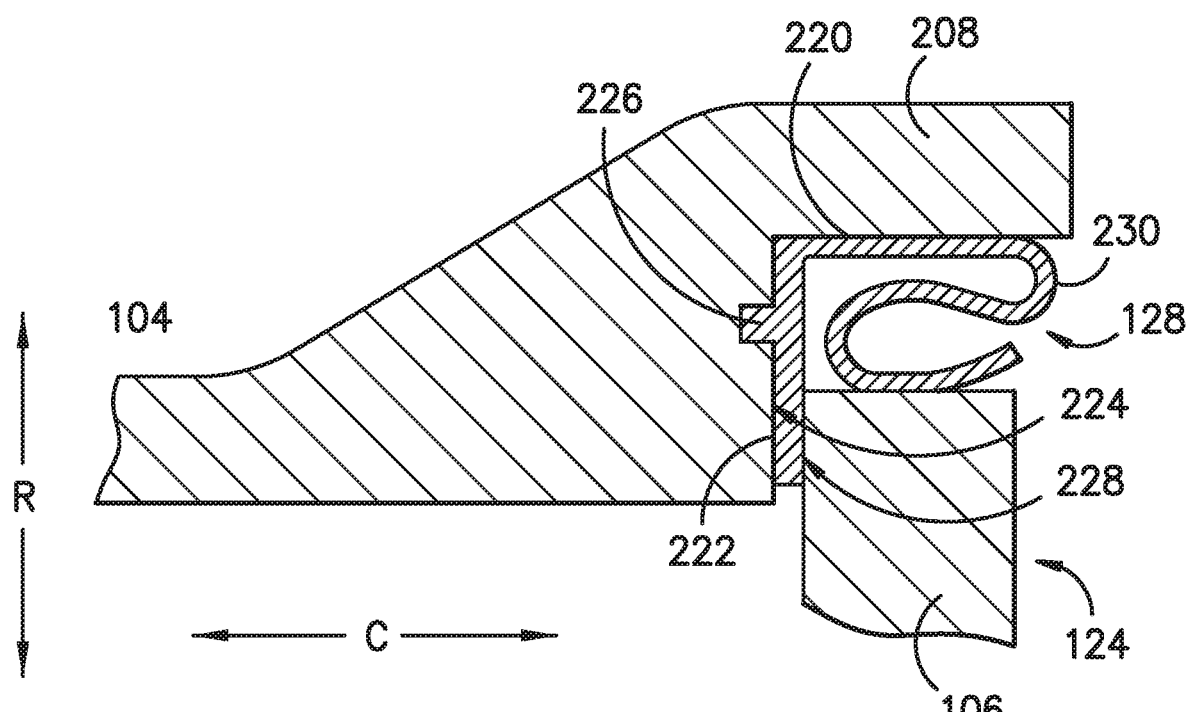
FIG. -15-
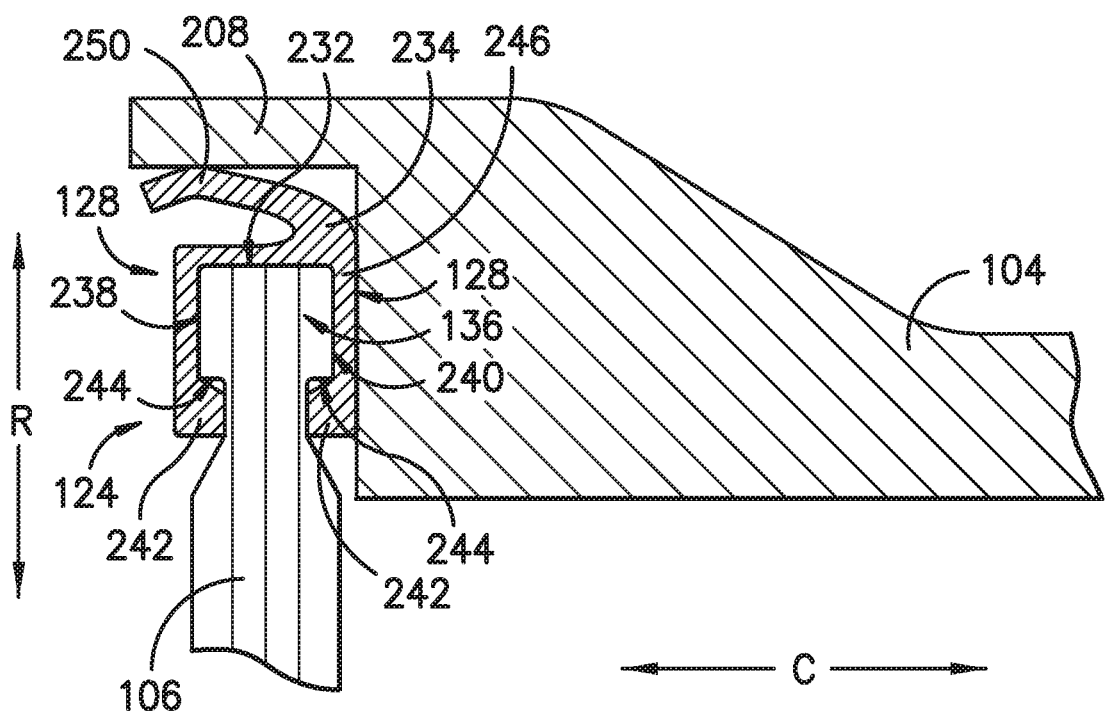
FIG. -16-

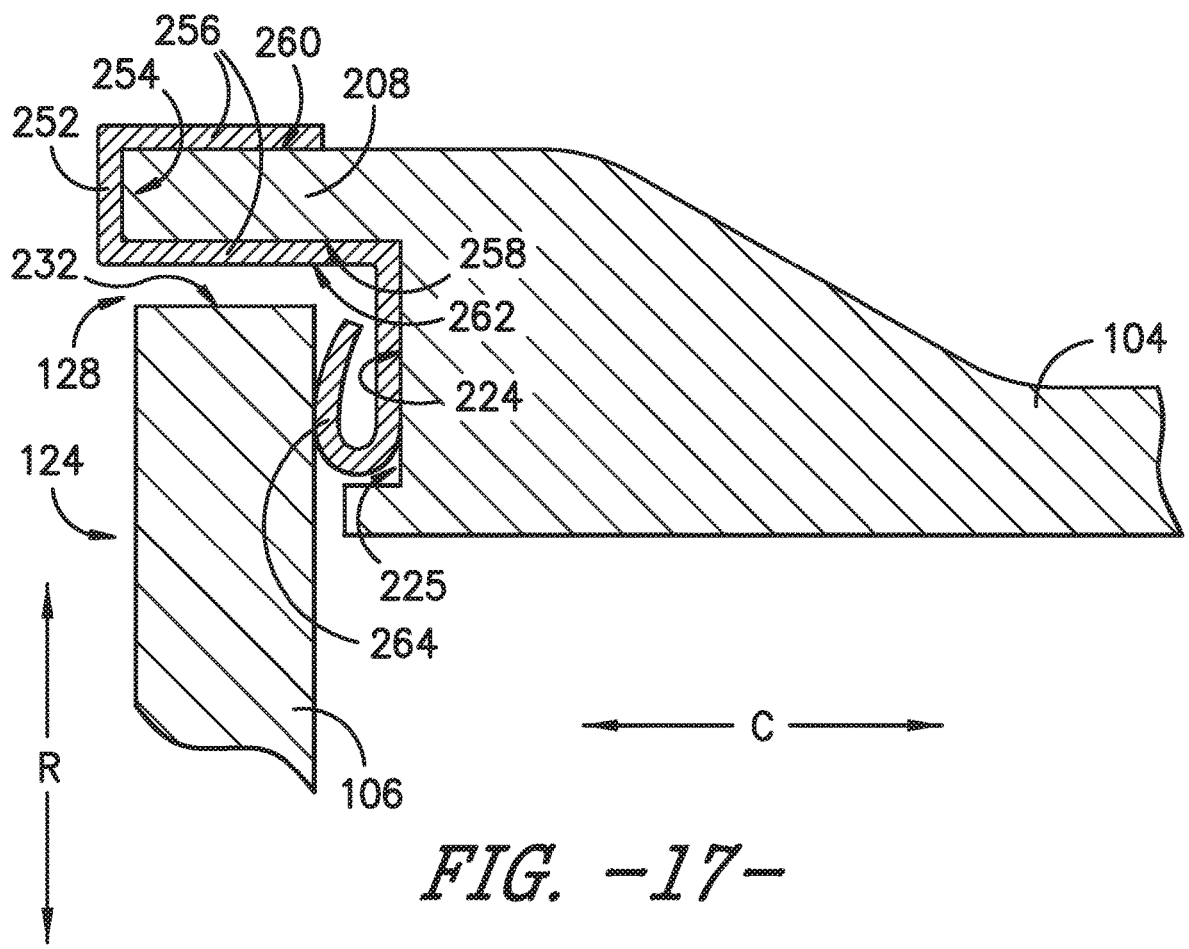
FIG. -17-
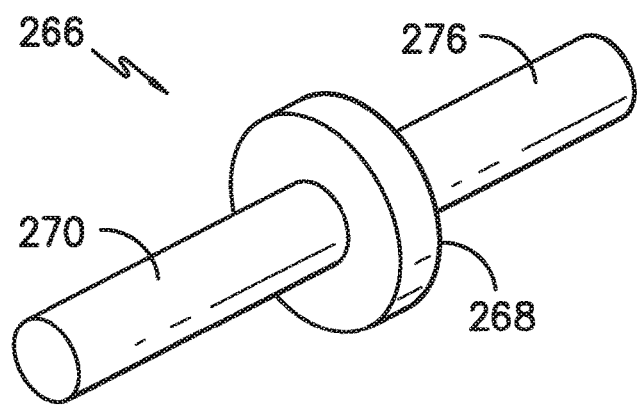
FIG. -18A-

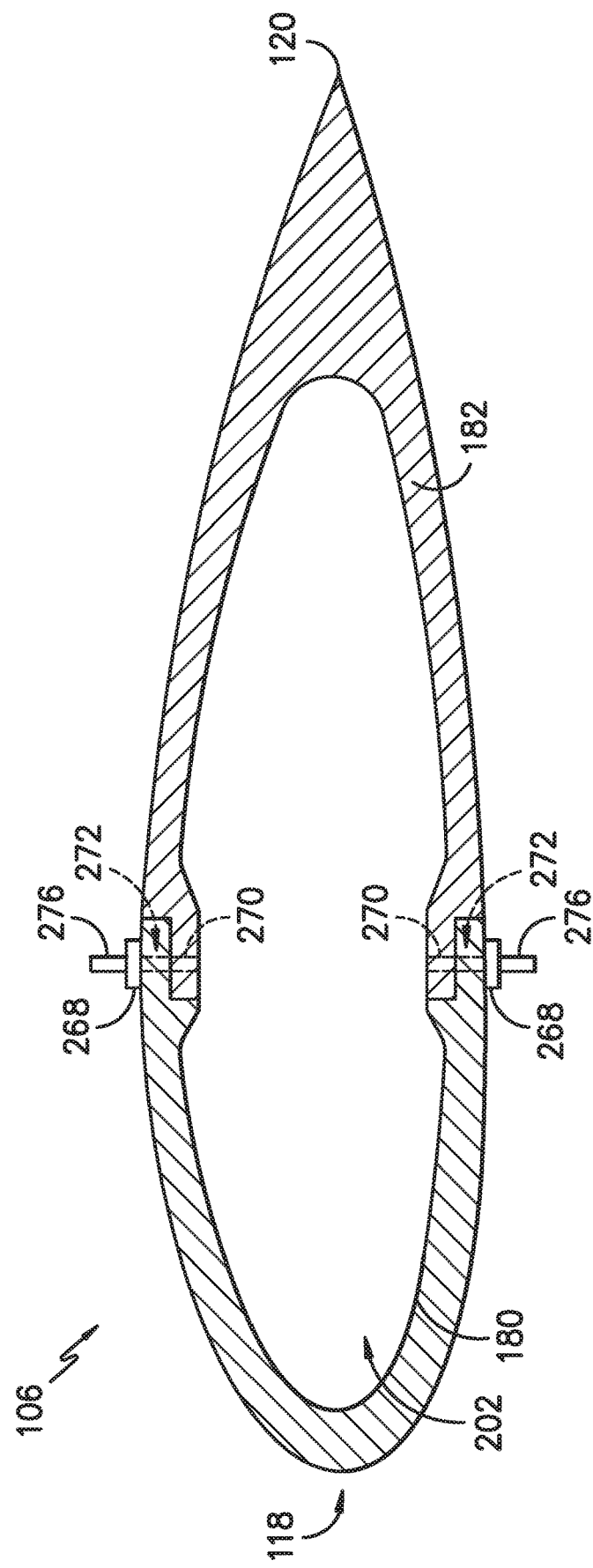

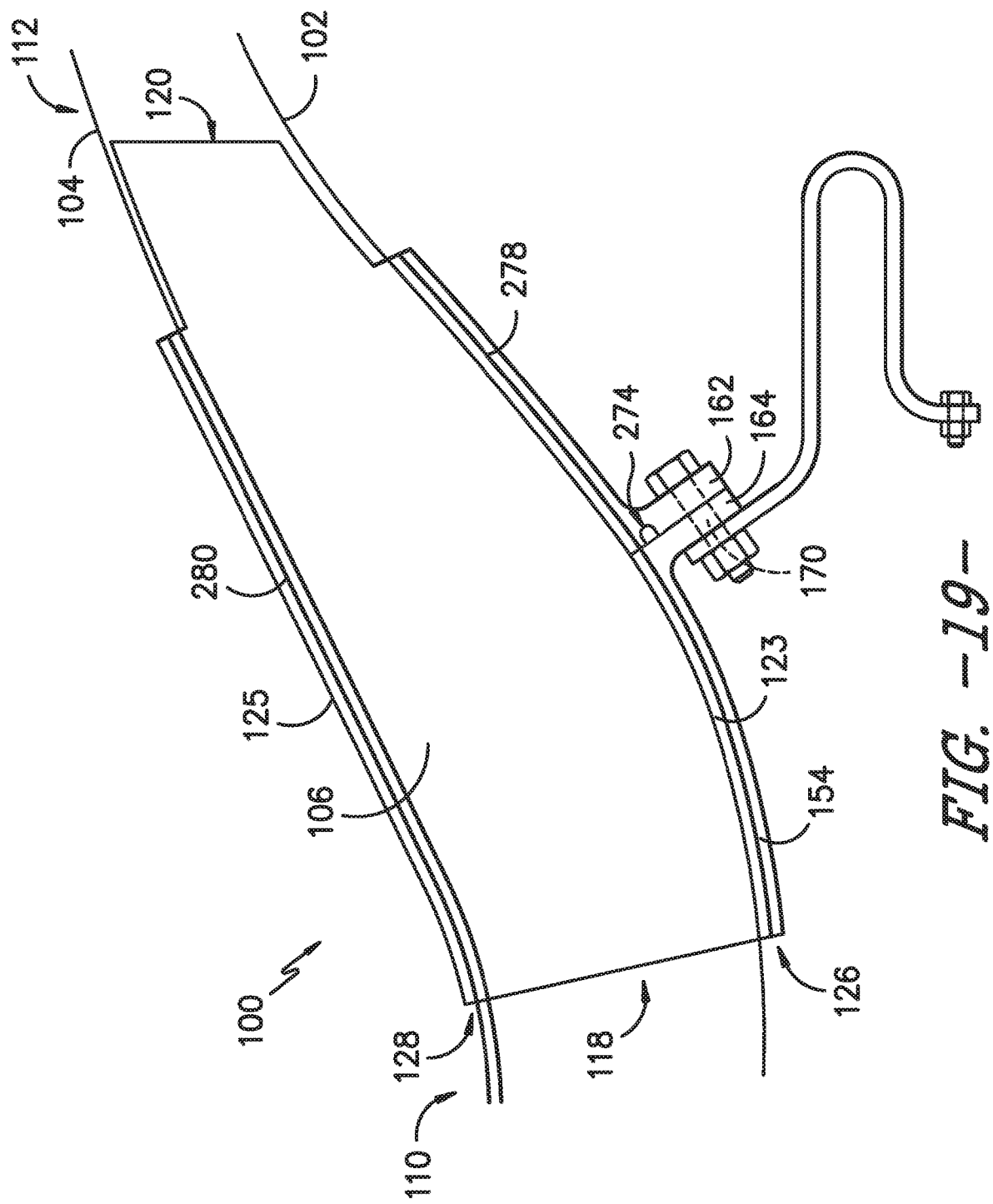

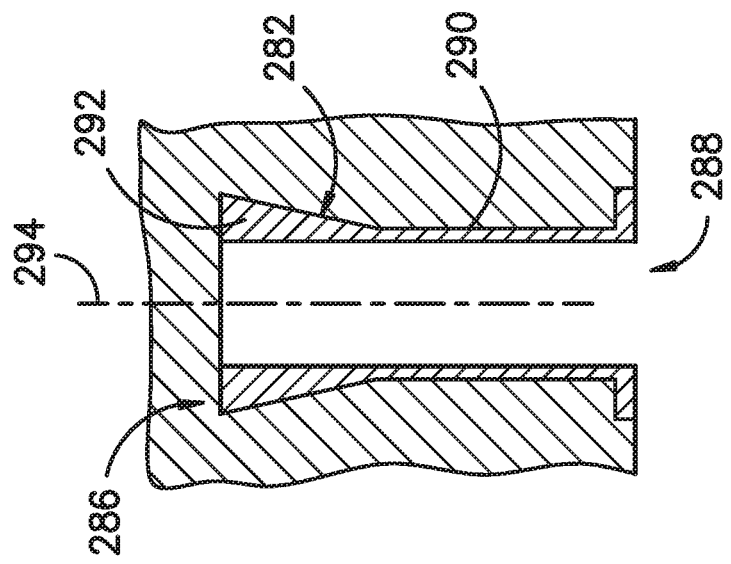
FIG. -20B-
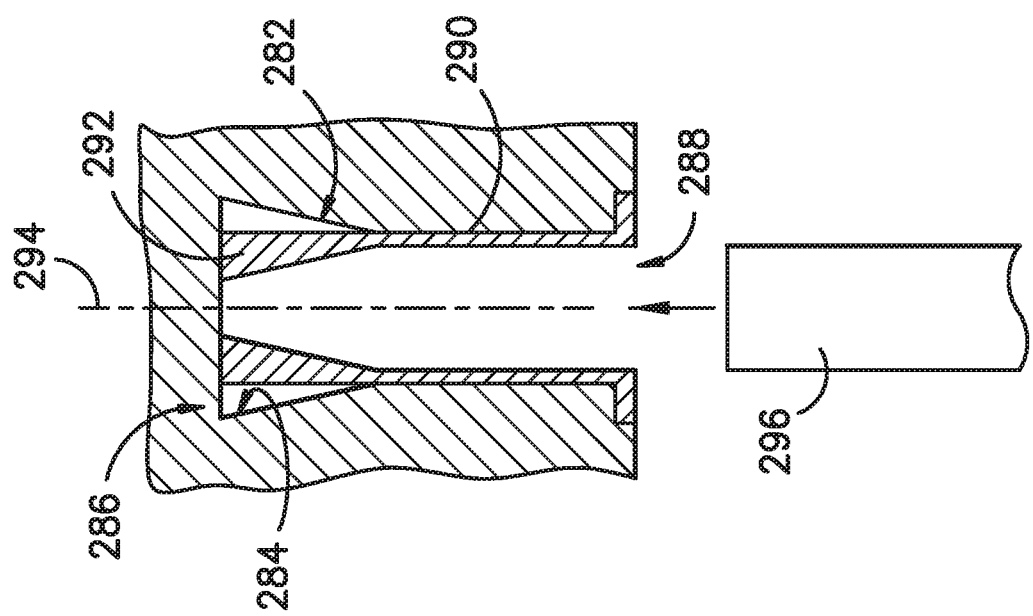
FIG. -20A-

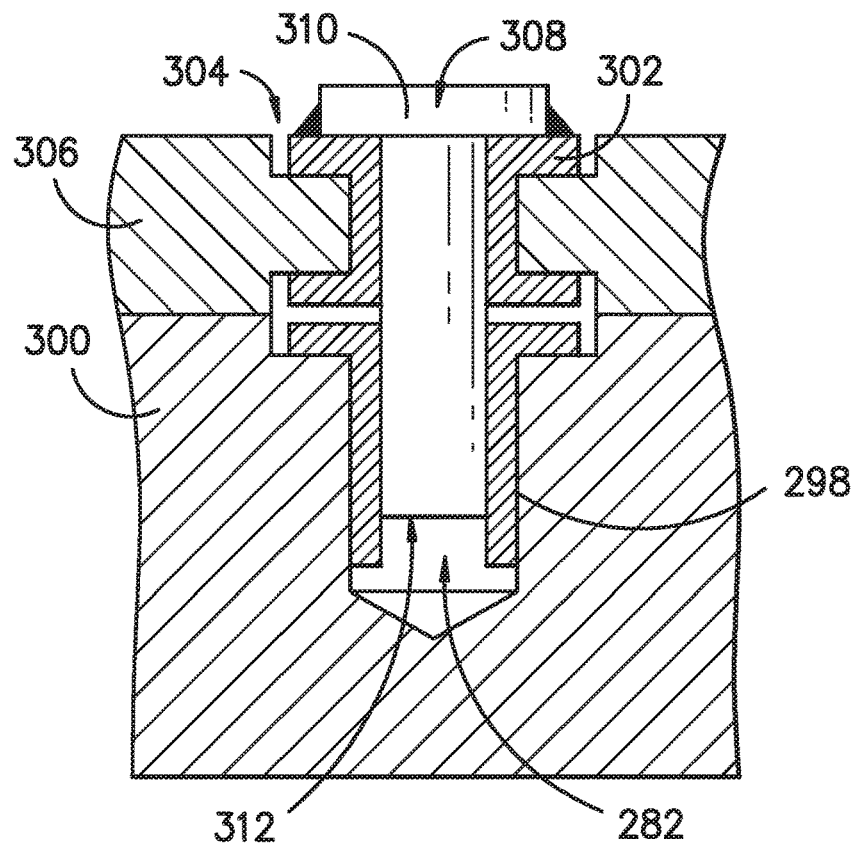
FIG. -21-
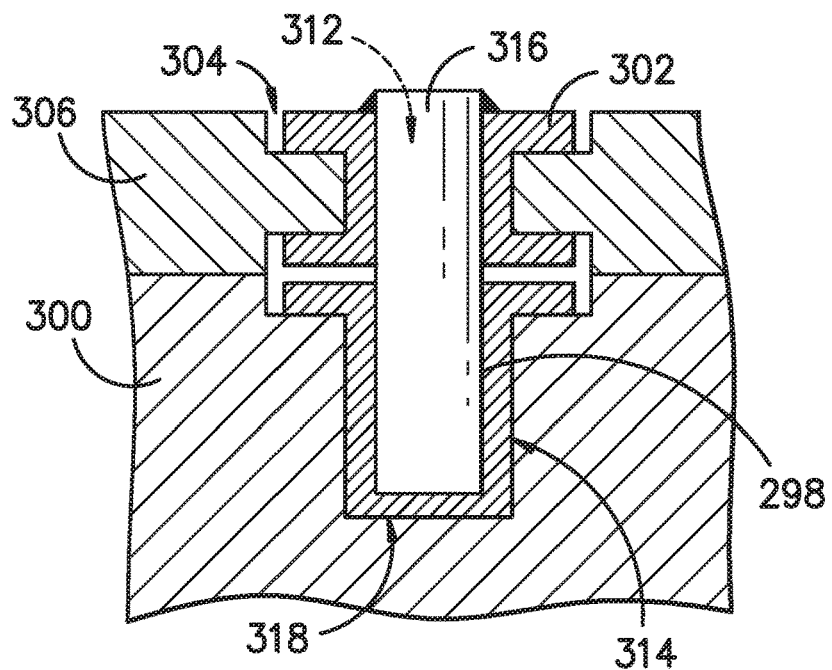
FIG. -22-

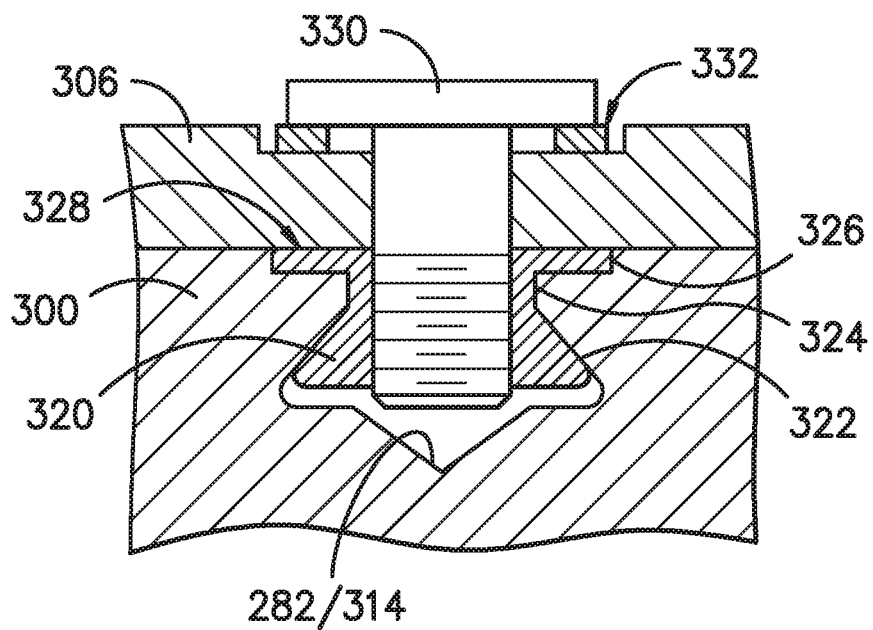
FIG. -23-
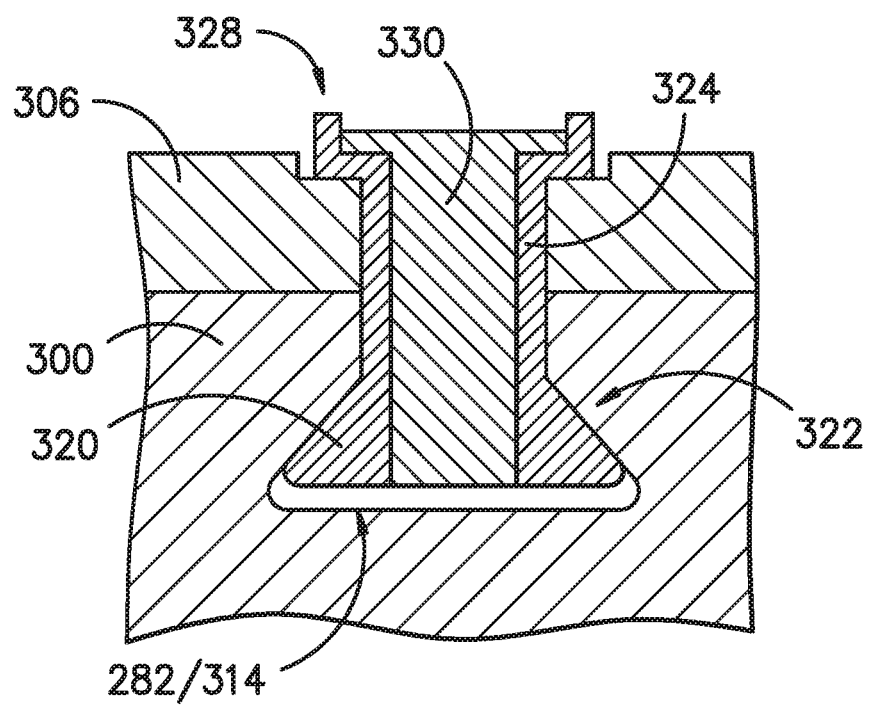
FIG. -24-

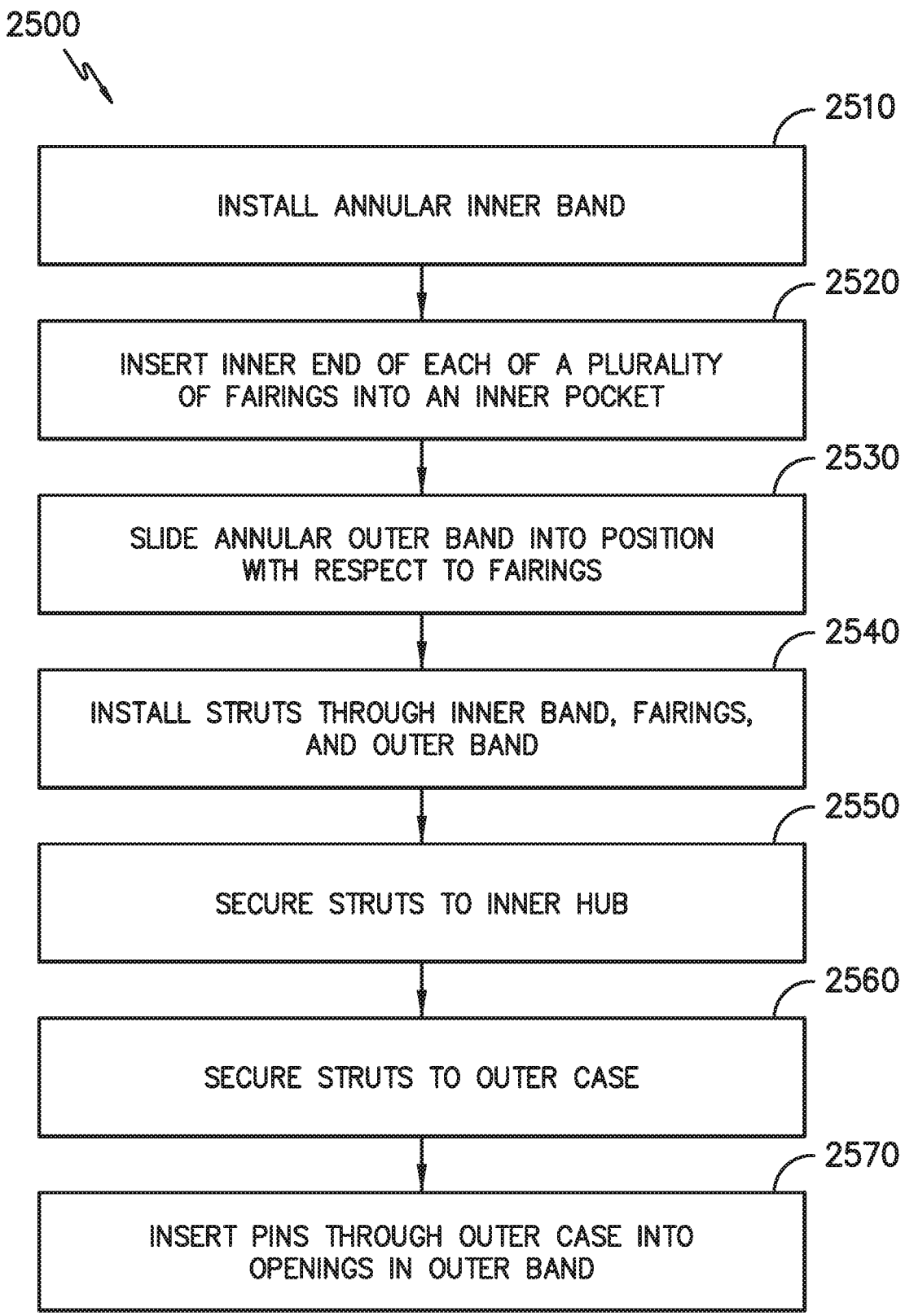
FIG. -25-

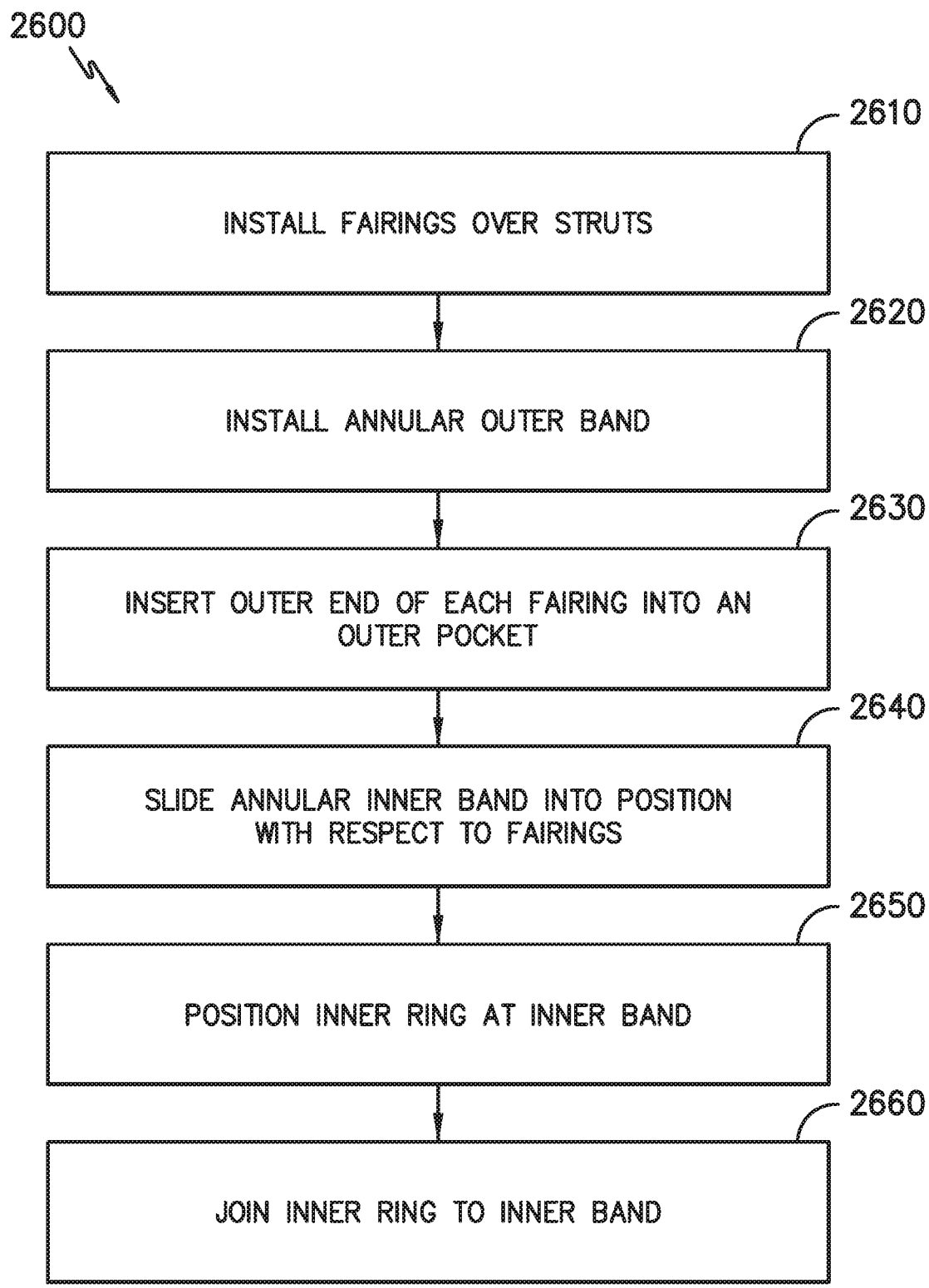
FIG. -26-

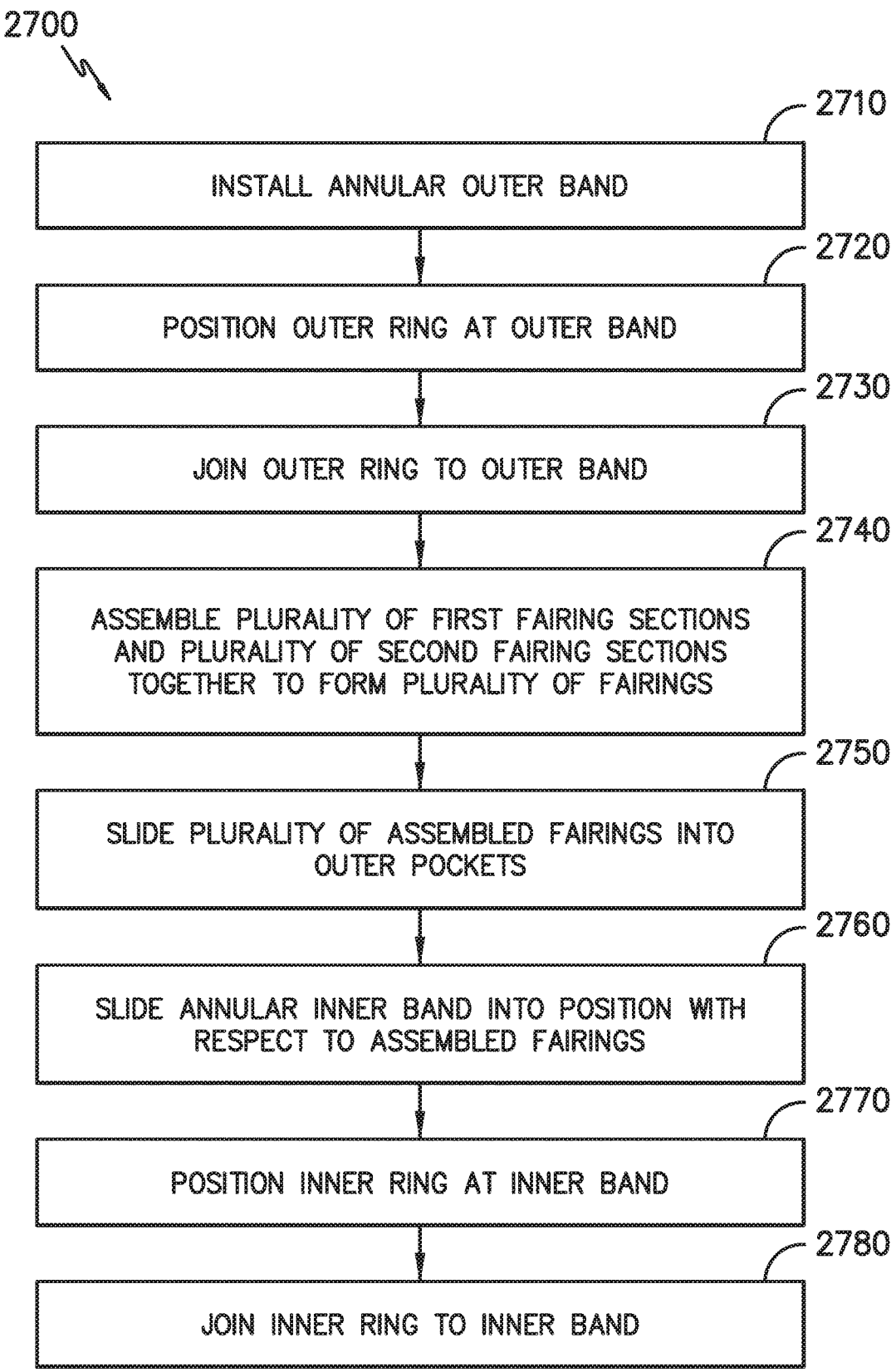
FIG. -27-

FAIRING ASSEMBLY

FIELD

The present subject matter relates generally to gas turbine engines. More particularly, the present subject matter relates to airfoil assemblies for gas turbine engines, such as fairing assemblies. Most particularly, the present subject matter relates to composite fairing assemblies.

BACKGROUND

More commonly, non-traditional high temperature composite materials, such as ceramic matrix composite (CMC) materials, are being used in applications such as gas turbine engines. Components fabricated from such materials have a higher temperature capability compared with typical components, e.g., metal components, which may allow improved component performance and/or increased engine temperatures. Composite components may provide other advantages as well, such as an improved strength to weight ratio.

Typically, a CMC turbine nozzle fairing comprises an airfoil, an inner band, and an outer band that are integrally formed as a single component that is split axially into forward and aft sections and split circumferentially into a plurality of segments. The plurality of segments together form an annular fairing assembly and splitting the component into forward and aft sections allows the airfoil portion to be installed around structural elements of the turbine frame, such as struts or the like. Although splitting the fairing assembly into sections and segments enables assembly with the turbine frame, having forward and aft sections for each of the plurality of segments increases a part count for the fairing assembly. Further, splitting the component increases the likelihood for leakages, e.g., between each circumferential fairing segment, which may also increase the part count by requiring seals or other mechanisms in an attempt to prevent such leakage. Additionally, thermal differences, i.e., a thermal fight, between the airfoil and bands produce high stresses in the nozzle fairings, which limits the acceptability of part defects and results in tighter inspection limits for non-destructive examination of the parts.

Accordingly, improved fairing assemblies would be useful. In particular, a fairing assembly comprising a plurality of fairing airfoils that are each separate from each of an annular, single piece inner band and an annular, single piece outer band would be advantageous. Further, a fairing assembly having single piece annular inner and outer bands that are adapted for use with multiple turbine frame configurations would be desirable.

BRIEF DESCRIPTION

Aspects and advantages of the invention will be set forth in part in the following description, or may be obvious from the description, or may be learned through practice of the invention.

In one exemplary embodiment of the present subject matter, a fairing assembly for a gas turbine engine is provided. The fairing assembly comprises a plurality of fairings, an annular inner band defining a plurality of inner pockets, and an annular outer band defining a plurality of outer pockets. Each fairing has an inner end radially spaced apart from an outer end and extends axially from a leading edge to a trailing edge. Each inner pocket is shaped complementary to the inner end of each fairing and has a forward end and an aft end. Each outer pocket is shaped complementary to the outer end of each fairing and has a forward end and an aft end. The inner band is a single piece structure, and the outer band is a single piece structure. The inner end of each fairing is received with an inner pocket of the plurality of inner pockets, and the outer end of each fairing is received within an outer pocket of the plurality of outer pockets.

In another exemplary embodiment of the present subject matter, a fairing assembly for a gas turbine engine is provided. The fairing assembly comprises a plurality of fairings, an inner ring defining a plurality of inner pocket forward segments, an annular inner band defining a plurality of inner pocket aft segments, and an annular outer band defining a plurality of outer pockets. Each fairing has an inner end radially spaced apart from an outer end and extends axially from a leading edge to a trailing edge. The inner ring is positioned against a forward edge of the inner band such that the inner pocket forward segments and inner pocket aft segments form a plurality of inner pockets. Each inner pocket is shaped complementary to the inner end of each fairing and has a forward end and an aft end. Further, each outer pocket is shaped complementary to the outer end of each fairing and has a forward end and an aft end. The inner ring is a single piece structure, the inner band is a single piece structure, and the outer band is a single piece structure. The inner end of each fairing is received with an inner pocket of the plurality of inner pockets, and the outer end of each fairing is received within an outer pocket of the plurality of outer pockets.

In a further exemplary embodiment of the present subject matter, a method for assembling a fairing assembly in a gas turbine engine is provided. The method comprises installing an annular inner band in the gas turbine engine. The inner band defines a plurality of inner pockets. The method further comprises inserting an inner end of each of a plurality of fairings into an inner pocket of the plurality of inner pockets. The method also comprises sliding an annular outer band into position with respect to the plurality of fairings such than an outer end of each of the plurality of fairings is received in an outer pocket of a plurality of outer pockets defined by the outer band. The inner band is a single piece structure, and the outer band is a single piece structure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIGS. 2A and 2B provide schematic cross-section views of a fairing assembly according to exemplary embodiments of the present subject matter.

FIG. 3 provides a perspective view of the fairing assembly of FIG. 2A or FIG. 2B.

FIG. 4 provides an exploded perspective view of an inner band and an outer band of the fairing assembly of FIG. 2A or FIG. 2B.

FIG. 5 provides a perspective view of a fairing airfoil of the fairing assembly of FIG. 2A or FIG. 2B.

FIGS. 6A and 6B provide schematic cross-section views of a fairing assembly according to exemplary embodiments of the present subject matter.

FIG. 7 provides a perspective view of the fairing assembly of FIG. 6A.

FIG. 8 provides an exploded perspective view of an inner band and an inner ring of the fairing assembly of FIG. 6A.

FIG. 9 provides a schematic cross-section view of a fairing assembly according to an exemplary embodiment of the present subject matter.

FIG. 10 provides a perspective view of the fairing assembly of FIG. 9.

FIG. 11 provides an exploded perspective view of an outer band and an outer ring of the fairing assembly of FIG. 9.

FIG. 12 provides an exploded perspective view of an axially split fairing airfoil according to an exemplary embodiment of the present subject matter.

FIG. 13 provides a schematic cross-section view of a circumferentially split fairing airfoil according to an exemplary embodiment of the present subject matter.

FIG. 14 provides a perspective view of a portion of a fairing assembly according to an exemplary embodiment of the present subject matter.

FIGS. 15, 16, and 17 provide radial cross-section views of a portion of a fairing outer end and an outer band pocket with a seal positioned therebetween, according to various exemplary embodiments of the present subject matter.

FIG. 18A provides a perspective view of a pin for pinning a fairing airfoil within a fairing assembly.

FIG. 18B provides an axial cross-section view of a split fairing airfoil having two pins as shown in FIG. 18A received therein, according to an exemplary embodiment of the present subject matter.

FIG. 19 provides a schematic cross-section view of a fairing assembly having pinned fairing airfoils, according to an exemplary embodiment of the present subject matter.

FIGS. 20A, 20B, and 21-24 provide schematic cross-section views of grommet and fastener configurations, according to various exemplary embodiments of the present subject matter.

FIGS. 25, 26, and 27 provide flow diagrams illustrating methods for assembling a fairing assembly in a gas turbine engine, according to various exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within or defining the hot gas path 78, may comprise a composite material, such as a ceramic matrix composite (CMC) material having high temperature capability. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a composite material may be used within the hot gas path 78, such as within the combustion and/or turbine sections of engine 10. As an example, one or more stages of turbine rotor blades and/or turbine nozzles may be CMC components formed from CMC materials. However, composite components made from CMC or other composite materials may be used in other sections as well, e.g., the compressor and/or fan sections.

Turning to FIGS. 2A and 2B, schematic cross-section views are provided of a fairing assembly 100 according to exemplary embodiments of the present subject matter. FIG. 3 provides a perspective view of the fairing assembly 100, FIG. 4 provides an exploded perspective view of an inner band 102 and outer band 104 of the fairing assembly 100, and FIG. 5 provides a perspective view of a fairing 106 of the fairing assembly 100. The fairing assembly 100 includes the inner band 102, the outer band 104 encircling the inner band 102, and a plurality of vanes or fairings 106 extending between the inner band 102 and the outer band 104. At least a portion of the fairings 106 are hollow and encircle or encase a plurality of struts 108, which are part of a turbine frame that includes an inner support structure 140, such as an inner hub, and an outer support structure 146, such as an outer case. As shown in FIGS. 2A and 2B, the inner and outer bands 102, 104 also define openings therethrough such that the struts 108 extend from the inner support structure 140 to the outer support structure 146. Conduits may run through some of the struts 108, and additional structures such as hangers and retainers may be included in the fairing assembly 100, e.g., for attaching the fairing assembly 100 to the engine casing, etc.

The fairing assembly 100 crosses the combustion gas flow path 78 and, thus, in operation is exposed to high temperatures. That is, in the depicted embodiment, the fairing assembly 100 is a turbine nozzle fairing assembly forming an annular turbine nozzle stage, e.g., a plurality of turbine nozzles positioned circumferentially about the axial centerline 12 of the engine 10. As such, each of the plurality of fairings 106, inner band 102, and outer band 104 form a liner along the hot gas path 78, protecting metallic components and the like from the heat of the combustion gases 66. Further, the exemplary fairing assembly 100 described herein forms a transition from the high pressure turbine 28 to the low pressure turbine 30 and, as such, each of the inner band 102 and outer band 104 are generally conical in shape, increasing in circumference from a forward end 110 of the fairing assembly 100 to an aft end 112 of the assembly 100.

As further shown in FIGS. 2A-5, the inner and outer bands 102, 104 are annular, single piece structures that are separate from each fairing 106. That is, each of the inner band 102, outer band 104, and plurality of fairings 106 are separately formed such that each component is an individual piece. In exemplary embodiments, the plurality of fairings 106, the inner band 102, and the outer band 104 are each formed from a composite material, such as a CMC material. However, in other embodiments, the inner band 102, outer band 104, and fairings 106 may be manufactured from any suitable material using any suitable process or technique. For instance, one or more of the components 102, 104, 106 may be formed from plies of a composite material in a process that includes laying up, debulking, curing, and densifying the composite; one or more of the components 102, 104, 106 may be formed from a suitable material in an additive manufacturing process; and/or one or more of the components 102, 104, 106 may be formed from a metallic material using a casting process or the like.

Keeping with FIGS. 2A-5, there may be any number of vanes or fairings 106 included in the fairing assembly 100. The fairings 106 may have airfoil shapes and may create an airfoil cascade. More particularly, each fairing airfoil 106 may have a concave pressure side 114 opposite a convex suction side 116, and each side 114, 116 may extend axially from a leading edge 118 to a trailing edge 120. Further, each fairing 106 may have an inner end 122 that is radially spaced apart from an outer end 124. During operation, the fairings 106 shape the air flow to improve the engine efficiency. The struts 108, which typically are not an airfoil shape, would negatively impact the airflow and usually are constructed of a material not capable of withstanding flow path conditions; therefore, the fairings 106 are included to form an airfoil around the struts 108. It will be understood that in the illustrated example, a portion of the fairings 106 surround structural elements, like the struts 108, while the remaining fairings 106 surround nothing structural. However, as shown in the figures, each fairing 106 may be hollow, defining a cavity 202 such that each fairing 106 has an internal cavity pressure as described in greater detail herein.

As shown in FIG. 4, the annular inner band 102 defines a plurality of inner pockets 126, and the annular outer band 104 defines a plurality of outer pockets 128. Each inner pocket 126 is shaped complementary to the inner end 122 of each fairing 106, and each outer pocket 128 is shaped complementary to the outer end 124 of each fairing 106. Further, each inner pocket 126 has a forward end 130 and an aft end 132, and each outer pocket 128 has a forward end 134 and an aft end 136. As illustrated in FIGS. 2A, 2B, and 3, the inner end 122 of each fairing 106 is received with an inner pocket 126 of the plurality of inner pockets 126, and the outer end 124 of each fairing 106 is received within an outer pocket 128 of the plurality of outer pockets 128. It will be appreciated that the fairing assembly 100 comprises an equal number of inner pockets 126, outer pockets 128, and fairings 106, with one fairing 106 positioned within one inner pocket 126 and a corresponding outer pocket 128. Moreover, for each fairing 106, the leading edge 118 of the fairing 106 is positioned at the forward end 130 of the inner pocket 126 and the forward end 134 of the outer pocket 128 in which the fairing 106 is received, and the trailing edge 120 of the fairing 106 is positioned at the aft end 132 of the inner pocket 126 and the aft end 136 of the outer pocket 128. Additionally, as depicted in FIG. 5, the inner end 122 of each fairing 106 may define an inner boss 123 and the outer end 124 of each fairing 106 may define an outer boss 125. The inner and outer pockets 126, 128 may be shaped to complement the inner and outer bosses 123, 125, respectively, such that the bosses 123, 125 are received in the pockets 126, 128. Further, each boss 123, 125 may provide an area for receipt of a seal, e.g., inner boss 123 may receive inner seal 278 and outer boss 125 may receive outer seal 280 as described in greater detail herein.

In the exemplary embodiment illustrated in FIGS. 2A-4, the inner band 102 surrounds each inner pocket 126 such that each inner pocket 126 is closed at its forward end 130 and aft end 132. That is, the inner pockets 126 are not open at either the forward end 110 or aft end 112 of the fairing assembly 100. Similarly, the outer band 104 surrounds each outer pocket 128 such that each outer pocket 128 is closed at its forward end 134 and aft end 136 and is not open at either the forward end 110 or aft end 112 of the fairing assembly 100. Accordingly, the illustrated fairing assembly 100 is compatible with a bolted frame (separable hub, strut, and case) or similar frame designs. More particularly, the fairing assembly 100 shown in FIGS. 2A-4 is suitable for a turbine frame that allows the single piece annular inner band 102 to be installed with respect to the frame, the fairings 106 positioned in the inner pockets 126, and the single piece annular outer band 104 to be slid into position such that the outer ends 124 of the fairings 106 are received in the outer pockets 128. Methods of assembling the fairing assembly 100 will be described in greater detail below.

Referring to FIG. 2A, in some embodiments the fairing airfoils 106 may be brazed to the inner band 102 and/or outer band 104. In an exemplary embodiment, each fairing 106 is brazed to the inner band 102 at or near the inner end 122 of the fairing 106 and each fairing 106 is brazed to the outer band 104 at or near the outer end 124 of the fairing 106. In other embodiments, the fairings 106 may be brazed at only one of the inner end 122 or outer end 124. It will be appreciated that, by brazing the fairing airfoils 106 to the inner and/or outer bands 102, 104, the need for seals between the bands 102, 104 and fairings 106 is eliminated. Further, brazing is not limited to embodiments in which the bands 102, 104 and fairings 106 are metallic, but also, e.g., brazing may be used where the bands 102, 104 and fairings 106 are CMC.

As further illustrated in FIGS. 2B and 3, each of the inner band 102 and outer band 104 may be pinned at the forward end 110 of the fairing assembly 100 to retain the assembly 100 in its position within the engine 10. More specifically, a plurality of radially extending inner pins 138 extend from a support structure 140 into a forward portion 142 of the inner band 102. Similarly, a plurality of radially extending outer pins 144 extend from a support structure 146 into a forward portion 148 of the outer band 104. The support structures 140, 146 may be hangers, retainers, or the like. In some embodiments, as previously described, the inner support structure 140 may be the hub of the turbine frame, and the outer support structure 146 may be the case of the turbine frame. As shown in FIGS. 2B and 3, the inner pins 138 may be received within openings 150 in the inner band 102, and the outer pins 144 may be received within openings 152 in the outer band 104. In some embodiments, the pins 138, 144 may be secured in the openings 150, 152 using grommets or the like such that the pins 138, 144 do not extend through the respective band 102, 104. In other embodiments, the pins 138, 144 may extend through the forward portion 142, 148 of the respective band 102, 104. Using radial pins 138, 144 allow for radial thermal expansion, e.g., of metallic support structures 140, 146, while constraining the fairing assembly 100 axially and tangentially. Such a retention configuration alleviates stresses and strains that would otherwise arise from a thermal mismatch between the fairing assembly 100 and the support structures 140, 146, e.g., where the fairing assembly 100 is formed from a composite material and the support structures 140, 146 are formed from metals or metal alloys, while still holding the fairing assembly 100 in position within the engine 10.

However, in some embodiments, the fairing assembly 100 may be bolted, or otherwise fastened, rather than pinned at its forward end 110. In particular embodiments, the assembly 100 may be bolted to one or more flexible metal hangers, which flex to compensate for the thermal growth of the metal hanger(s) relative to the assembly 100, which may be formed from a composite material and have a different rate of thermal expansion. In further embodiments, the fairing airfoils 106 may include a feature that allows the fairings 106 to be bolted to a hanger. Other means for retaining the fairing assembly 100 in its position within the engine 10 may be used as well.

Further, as shown in FIG. 2A, in embodiments in which the fairing airfoils 106 are brazed to the inner band 102 and outer band 104, the radial inner pins 138 or the radial outer pins 144 may be eliminated. More particularly, by brazing the fairings 106 to the bands 102, 104, the fairing assembly 100 is effectively a single piece structure, and thus, the assembly 100 need only be pinned at the inner band 102 or outer band 104. Although shown in FIG. 2A with outer pins 144, it will be understood that, in alternative embodiments, the outer pins 144 may be eliminated and the inner pins 138 may be used to pin the assembly 100 at its forward end 110. Additionally, the inner pins 138 or outer pins 144 may be eliminated in embodiments in which the fairing airfoils 106 are otherwise attached at the inner band 102 and outer band 104, e.g., where the fairings 106 are pinned to the bands 102, 104 as described herein.

Turning now to FIGS. 6A-8, other exemplary embodiments of the fairing assembly 100 will be described. FIGS. 6A and 6B each provide a schematic cross-section view of a fairing assembly 100, and FIG. 7 provides a perspective view of the fairing assembly 100 of FIG. 6A. FIG. 8 provides an exploded perspective view of the inner band 102 and an inner ring 154 of the fairing assembly 100 of FIG. 6A. Although not depicted in FIGS. 6A and 6B, it will be appreciated that the fairing assembly 100 will be installed with a turbine frame like the turbine frame shown and described with respect to FIGS. 2A and 2B, although the turbine frame of FIGS. 6A and 6B may be configured differently from the turbine frame depicted in FIGS. 2A and 2B. For example, the fairing assembly 100 depicted in FIGS. 6A-8 may be used with a two-piece turbine frame, or similar frame design, rather than a bolted turbine frame or the like as described above with respect to FIGS. 2A-5. An exemplary two-piece frame comprises a hub and strut assembly and a separable outer case, but other two-piece frames also may be used.

As depicted in FIGS. 6A-8, the fairing assembly 100 may comprise an annular, single piece inner ring 154 in addition to the annular, single piece inner band 102. More particularly, in some embodiments each inner pocket 126 is open at its forward end 130 and closed at its aft end 132. As such, the inner band 102 defines a plurality of inner pocket aft segments 156. The inner ring 154 is positioned against a forward edge 160 of the inner band 102 to close the forward end 130 of each inner pocket 126. Further, the inner ring 154 defines a plurality of inner pocket forward segments 158, and each inner pocket forward segment 158 in the inner ring 154 has a corresponding inner pocket aft segment 156 in the inner band 102. The inner pocket forward segments 158 align with the inner pocket aft segments 156 such that each inner pocket forward segment 158 and its corresponding inner pocket aft segment 156 together form one of the plurality of inner pockets 126. Thus, the inner pockets 126 are split, with a forward portion (i.e., inner pocket forward segment 158) of each inner pocket 126 defined by the inner ring 154 and an aft portion (i.e., inner pocket aft segment 156) of each inner pocket 126 defined by the inner band 102.

As illustrated in FIGS. 6A and 8, in some embodiments the inner band 102 is truncated or shortened, and the inner ring 154 extends beyond a forward portion of the fairings 106. In the depicted embodiment, a flange 162 extends from the forward edge 160 of the inner band 102, and a flange 164 extends from an aft edge 166 of the inner ring 154. Each flange 162, 164 defines a plurality of apertures 168, and when the inner ring 154 is positioned against the forward edge 160 of the inner band 102, apertures 168 of the inner band flange 162 align with apertures 168 of the inner ring flange 164. A fastener 170, such as a bolt, grommet, rivet, or the like, may extend through the flanges 162, 164 within each pair of aligned apertures 168 to attach or couple the inner ring 154 to the inner band 102. As shown most clearly in FIG. 6A, the forward edge 160 of the inner band 102 is defined axially aft or downstream of the leading edges 118 of the fairings 106, such that a joint defined where the inner ring 154 is positioned against the inner band 102 is aft or downstream of the leading edge 118 of each fairing 106.

In other embodiments, as shown in FIG. 6B, the inner band 102 is not truncated or shortened, and the inner ring 154 functions primarily to close the forward end 130 of each inner pocket 126. In such embodiments, the inner ring 154 also provides additional structure to the inner band 102, e.g., to provide support for the fairing assembly 100 at its forward inner end. It will be appreciated that the inner ring 154 shown in FIG. 6B therefore may be similar to the outer ring 172 described herein, for example, with respect to FIGS. 9-11.

Further, it will be appreciated that the outer band 104 and fairings 106 of the embodiment of the fairing assembly 100 shown in FIGS. 6A-8 may be the same as the outer band 104 and fairings shown in detail in FIGS. 4 and 5. That is, the fairing assembly 100 illustrated in FIGS. 6A-8 comprises an annular single piece outer band 104. The plurality of fairings 106, an example of which is illustrated in FIG. 5, extend from the inner pockets 126 defined by the inner ring 154 and inner band 102 to the outer pockets 128 defined by the outer band 104. Moreover, the inner band 102 and the inner ring 154 are generally conical in shape, like the inner band 102 shown in FIGS. 2A-4.

Like the embodiments shown in and described with respect to FIGS. 2A-5, the fairing assembly 100 of FIGS. 6A-8 may be pinned at the forward end 110 of the assembly 100 to retain the assembly 100 in position within the gas turbine engine 10. As previously described, the radial pins 138, 144 allow some radial movement, e.g., to compensate for different rates of thermal growth in the radial direction R by components formed from different materials, while constraining the fairing assembly 100 axially and tangentially (or circumferentially). In some embodiments, however, the fairing assembly 100 may be bolted rather than pinned to, e.g., the turbine frame, as described above. In particular embodiments, the assembly 100 may be bolted to one or more flexible metal hangers, which flex to compensate for the thermal growth of the metal hanger(s) relative to the assembly 100, which may be formed from a composite material and have a different rate of thermal expansion. In further embodiments, the fairing airfoils 106 may include a feature that allows the fairings 106 to be bolted to a hanger. Other means for retaining the fairing assembly 100 in its position within the engine 10 may be used as well.

As described herein, the fairing assembly 100 illustrated in FIGS. 6A-8 is compatible with a two-piece frame or similar frame designs. More particularly, the fairing assembly 100 shown in FIGS. 6A-8 is suitable for a turbine frame that allows the single piece annular outer band 104 to be installed with respect to the frame, the outer ends 124 of the fairings 106 positioned in the outer pockets 128, and the single piece annular inner band 102 and the inner ring 154 to be slid into position such that the inner ends 122 of the fairings 106 are received in the inner pockets 126. Methods of assembling the fairing assembly 100 will be described in greater detail below.

Referring now to FIGS. 9-13, another exemplary embodiment of the fairing assembly 100 will be described. FIG. 9 provides a schematic cross-section view of the fairing assembly 100, and FIG. 10 provides a perspective view of the fairing assembly 100. FIG. 11 provides an exploded perspective view of the outer band 104 and an outer ring 172 of the fairing assembly 100. FIG. 12 provides an exploded perspective view of an axially split fairing 106, and FIG. 13 provides a schematic cross-section view of a circumferentially split fairing 106. Further, although not depicted in FIG. 9, it will be appreciated that the fairing assembly 100 will be installed with a turbine frame like the turbine frame shown and described with respect to FIGS. 2A and 2B, although the turbine frame of FIG. 9 may be configured differently from the turbine frame depicted in FIGS. 2A and 2B, as well as the turbine frame with which the fairing assembly 100 of FIGS. 6A-8 is used. For instance, the fairing assembly 100 depicted in FIGS. 9-13 may be used with a single piece or integral turbine frame, or similar frame design, rather than a bolted turbine frame or the like as described above with respect to FIGS. 2A-5.

As depicted in FIGS. 9-11, the fairing assembly 100 may comprise an annular, single piece outer ring 172 in addition to the annular, single piece outer band 104. More specifically, as shown most clearly in FIG. 11, in some embodiments of the outer band 104, each outer pocket 128 is open at its forward end 134 and closed at its aft end 136. The outer band 104 includes a forward flange 174, and the outer ring 172 is positioned radially inward of the forward flange 174, as illustrated in FIGS. 9 and 10. The outer ring 172 extends across the open forward ends 134 of the outer pockets 128 to close the forward end 134 of each outer pocket 128; the outer band 104 is otherwise generally the same as the outer band 104 shown in FIGS. 2A-4. The outer ring 172 may be relatively thick along the radial direction R to provide structural support at the forward end 110 of the assembly 100; as shown in FIGS. 2A-4, 6, and 7, in other embodiments the outer band 104 is relatively thick at the forward end 110 to provide structural support to the assembly 100. Further, as illustrated in FIGS. 9 and 10, the same inner band 102 and inner ring 154 are used in the embodiment of fairing assembly 100 shown in FIGS. 9-12 as in the embodiment of fairing assembly 100 illustrated in FIGS. 6A, 7, and 8.

Moreover, like the embodiments shown in and described with respect to FIGS. 2A-5 and 6-8, the fairing assembly 100 of FIGS. 9-12 may be pinned at the forward end 110 of the assembly 100 to retain the assembly 100 in position within the gas turbine engine 10. A plurality of apertures 176 may be defined in the forward flange 174 of the outer band 104 and a plurality of openings 178 may be defined in the outer ring 172. The apertures 176 are defined in the outer band 104 and the openings 178 are defined in the outer ring 172 such that when the outer ring 172 is assembled with the outer band 104, the outer band apertures 176 align with the outer ring openings 178. An outer pin 144 may be received in each pair of aligned outer band apertures 176 and outer ring openings 178 to retain the outer ring 172 with respect to the outer band 104.

Further, as previously described, the radial pins 138, 144 allow some radial movement, e.g., to compensate for different rates of thermal growth in the radial direction R by components formed from different materials, while constraining the fairing assembly 100 axially and tangentially (or circumferentially). In some embodiments, however, the fairing assembly 100 may be bolted rather than pinned to, e.g., the turbine frame, as described above. In particular embodiments, the assembly 100 may be bolted to one or more flexible metal hangers, which flex to compensate for the thermal growth of the metal hanger(s) relative to the assembly 100, which may be formed from a composite material and have a different rate of thermal expansion. In further embodiments, the fairing airfoils 106 may include a feature that allows the fairings 106 to be bolted to a hanger. Other means for retaining the fairing assembly 100 in its position within the engine 10 may be used as well.

As described herein, the fairing assembly 100 illustrated in FIGS. 9-11 is compatible with a single piece frame or similar frame designs. More particularly, the fairing assembly 100 shown in FIGS. 9-11 utilizes two annular pieces at each of the inner portion and outer portion of the assembly 100 such that the assembly 100 can be installed around the single piece frame. Further, referring particularly to FIG. 12, at least one fairing 106 of the plurality of fairings 106 may be split axially into a forward section 180 and an aft section 182 such that the fairing 106 may be positioned around and encircle one of the struts 108. That is, because of the turbine frame design, the fairings 106 must be split to be installed around the struts 108. The forward section 180 and aft section 182 of each fairing 106 may abut along a first join line 184 and a second join line 186. More particularly, the forward section 180 and aft section 182 may each define a rabbet or one half of a half lap joint. The forward and aft sections 180, 182 connect together along the first and second join lines 184, 186 to form the fairing 106. Further, it will be understood that the inner band 102 and outer band 104, in which the respective ends 122, 124 of the fairing 106 are received, help keep the forward and aft sections 180, 182 together (i.e., help keep the forward and aft sections 180, 182 from coming apart).

In other embodiments, as illustrated in FIG. 13, at least one fairing 106 of the plurality of fairings 106 may be split circumferentially into a first side section 188 and a second side section 190; one side section 188, 190 may correspond to the pressure side and the other side section 188, 190 may correspond to the suction side of the airfoil-shaped fairing 106. The first side section 188 and second side section of each fairing 106 abut along a first joint 192 at the leading edge 118 and a second joint 194 at the trailing edge 120. As shown in FIG. 13, each of the first joint 192 and second joint 194 are overlapping joints, e.g., the second side section 190 overlaps the first side section 188 at the first joint 192 and the first side section 188 overlaps the second side section 190 at the second joint 194. More particularly, each of the first and second side sections 188, 190 define notches 196 along the leading 118, and the first and second side section 188, 190 fit together along the notches 196 to form overlapping first joint 192. The first side section 188 defines a notch 198 at the trailing edge 120, and the second side section 190 defines a projection 200 that fits within the notch 198 to form overlapping second joint 194. Moreover, it will be appreciated that the inner band 102 and outer band 104, in which the respective ends 122, 124 of the fairing 106 are received, help keep the first and second side sections 188, 190 together (i.e., help keep the first and second side sections 188, 190 from coming apart).

As illustrated in FIGS. 5, 12, and 13, whether formed as a single piece structure, split axially, or split circumferentially, each fairing 106 defines a cavity 202, which may be sized to receive a strut 108 or other structural component. A fluid may be received in each fairing airfoil cavity 202 such that the internal pressure of the fairing 106 is higher than the external pressure of the fairing 106. In the split fairing embodiments of FIGS. 12 and 13, the higher cavity pressure may help push the fairing sections 180, 182 and 188, 190 together for a tight seal between the sections. Further, as illustrated in FIG. 13, any leakage from the cavity 202 would be forced axially to the trailing edge 120 and second joint 194 of the fairing 106. Accordingly, a seal 204, such as a spline seal or the like, may extend along the second joint 194 between the first side section 188 and second side section 190, e.g., between the notch 198 and projection 200, to help reduce leakage from the higher pressure cavity 202. Other seals also may be included with either fairing 106 shown in FIGS. 12 and 13 to help reduce leakage from the cavity 202.

Turning now to FIG. 14, each inner pocket 126 and outer pocket 128 may be built up to create a stop for each fairing 106. Further, each of the inner band 102 and outer band 104 may be built up at the aft end 112 of the fairing assembly 100 to provide an area for a seal at each of the inner band 102 and outer band 104. More specifically, each inner pocket 126 comprises a lip 206 that extends about the inner pocket 126, and the inner end 122 of each fairing 106 is received within an inner pocket 126 such that the inner end 122 contacts the lip 206. Similarly, each outer pocket 128 comprises a lip 208 that extends about the outer pocket 128, and the outer end 124 of each fairing 106 is received within an outer pocket 128 such that the outer end 124 contacts the lip 208. As such, the inner lip 206 acts as an inner stop for the fairing 106, and the outer lip 208 acts as an outer stop for the fairing 106, where the inner and outer lips 206, 208 help prevent radial and/or tangential (or circumferential) slippage of the fairings 106. In some embodiments, a seal 210 such as a wire seal may extend around each of the inner pockets 126 and outer pockets 128, e.g., in the inner and outer pockets 126, 128 near where the inner and outer bands 102, 104 are built up to define the lips 206, 208 such that the seals 210 can contact each of the inner end 122 and outer end 124 of the fairings 106 to form a seal between the fairings 106 and the bands 102, 104. Because the internal pressure of the fairings 106 is greater than the external or flow path pressure, the internal pressure pushes the fairings 106 into the seals 210, which helps increase the effectiveness of the seals 210, i.e., creates a good seal between the fairings 106 and the bands 102, 104. The split fairings 106 shown in FIGS. 12 and 13 may have particularly good seals between the fairings 106 and the bands 102, 104, as the higher internal pressure of the fairings 106 pushes the sections 180, 182 or 188, 190 into the seals 210 and bands 102, 104.

Further, an aft edge 212 of the inner band 102 may be built up, e.g., may be thicker than the rest of the inner band 102, to define an inner surface 214. Likewise, an aft edge 216 of the outer band 104 may be built up, e.g., may be thicker than the rest of the outer band 104, to define an outer surface 218. Each of the inner surface 214 and outer surface 218 may provide a surface against which a seal, such as a piston ring seal or the like, may be positioned such that the fairing assembly 100 is sealed at its aft end 112 along each of the inner band 102 and outer band 104.

FIGS. 15, 16, and 17 provide radial cross-section views of a portion of a fairing end and a band pocket with a seal positioned therebetween, e.g., to provide sealing and wear protection between the fairing 106 and respective band 102, 104, according to various exemplary embodiments of the present subject matter. Referring particularly to FIG. 15, a radial cross-section view is provided of a portion of an outer pocket 128 of outer band 104 and outer end 124 of fairing 106 according to an exemplary embodiment of the present subject matter. As shown in FIG. 15, a seal 220 may be positioned between the outer end 124 of the fairing 106 and the outer pocket 128 of the outer band 104. More particularly, the seal 220 includes a wear portion 222 that extends along a radial surface 224 of the outer pocket 128. A retainer portion 226 extends from the wear portion 222 of the seal 220 into the outer band 104, e.g., to retain the seal 220 in position within the outer pocket 128. The retainer portion 226 may extend about the entire seal 220, which may extend about the entire perimeter of the outer pocket 128, or the seal 220 may define a plurality of retainer portions 226 that are spaced apart from other another such that the retainer portions 226 are received within the outer pocket 128 at various locations about the outer pocket 128.

Further, the wear portion 222 of the seal 220 defines a planar wear surface 228 against which the outer end 124 of the fairing 106 may be positioned. That is, the wear surface 228 of the seal 220 is between the outer end 124 of the fairing 106 and the outer band 104 such that the fairing 106 may rub or slide against, or otherwise contact, the seal 220 rather than the outer band 102, thereby helping prevent wear between the fairing 106 and outer band 104 in the area of the outer pocket 128. Additionally, the seal 220 includes a seal arm 230 that is compressed between the outer end 124 of the fairing 106 and the outer band 104. More specifically, the seal arm 230 extends between the lip 208 of the outer pocket 128 and a radially outermost surface 232 of the fairing 106. The seal arm 230 is curved such that it has a generally serpentine or S-shaped cross-section. In the exemplary embodiment illustrated in FIG. 15, the seal arm 230 projects from the wear portion 222 in contact with the outer pocket lip 208, then curves toward the surface 232 of the fairing 106 until the seal arm 230 contacts the surface 232. Thus, the seal 220 is configured to allow for radial thermal growth of the outer band 102, fairing 106, seal 220, and/or components surrounding and/or supporting the fairing assembly 100, while also providing a seal and wear protection between the fairing 106 and outer pocket 128.

It will be appreciated that a plurality of seals 220 may be provided for the fairing assembly 100. One seal 220 of the plurality of seals 220 may extend within each outer pocket 128 such that the seal 220 is between the outer pocket 128 and the outer end 124 of the fairing 106 received within the outer pocket 128. Further, seals 220 also may be used between the inner end 122 of the fairing 106 and the inner pocket 126. In such embodiments, the inner fairing end 122, inner pocket 126, and seal 220 may be configured as shown in FIG. 15, with the seal arm 230 extending radially outward rather than radially inward from the seal 220, i.e., when used as an inner seal 220, the seal 220 will be flipped or rotated about the circumferential direction C from the view provided in FIG. 15.

Turning to FIG. 16, a radial cross-section view is provided of a portion of an outer pocket 128 of outer band 104 and outer end 124 of fairing 106 according to another exemplary embodiment of the present subject matter. As shown in FIG. 16, a seal 234 may be positioned between the outer end 124 of the fairing 106 and the outer pocket 128 of the outer band 104. More particularly, the seal 234 defines a channel 236 into which the outer end 124 of the fairing 106 is received such that the seal 234 clips on or otherwise attaches to the fairing outer end 124. In the depicted embodiment, the fairing outer end 124 is notched along an inner surface 238 and an outer surface 240, and the seal 234 includes projections 242 that are received in the notches 244 to attach the seal 234 to the fairing outer end 124. Further, the seal 234 includes a wear portion 246 that defines a planar wear surface 248 that may be positioned against the outer pocket 128. That is, the wear surface 248 of the seal 234 is between the outer end 124 of the fairing 106 and the outer band 104 such that the seal 234 may rub or slide against, or otherwise contact, the outer band 104 rather than the fairing 106 contacting the outer band 104, thereby helping prevent wear between the fairing 106 and outer band 104 in the area of the outer pocket 128.

Moreover, like the seal 220 shown in FIG. 15, the seal 234 includes a seal arm 250 that is compressed between the outer end 124 of the fairing 106 and the outer band 104. More specifically, the seal arm 250 extends between the radially outermost surface 232 of the fairing 106 and the lip 208 of the outer pocket 128. The seal arm 250 is curved such that it has a generally C-shaped or U-shaped cross-section. In the exemplary embodiment illustrated in FIG. 16, the seal arm 250 projects from the seal channel 236 and curves toward the outer pocket lip 208 until the seal arm 250 contacts the lip 208. As such, the seal 234 is configured to allow for radial thermal growth of the outer band 102, fairing 106, seal 234, and/or components surrounding and/or supporting the fairing assembly 100, while also providing a seal and wear protection between the fairing 106 and outer pocket 128.

It will be understood that a plurality of seals 234 may be provided for the fairing assembly 100. One seal 234 of the plurality of seals 234 may extend around the outer end 124 of each fairing 106 such that the seal 234 is between the outer pocket 128 and the outer end 124 of the fairing 106 received within the outer pocket 128. Further, seals 234 also may be used between the inner end 122 of the fairing 106 and the inner pocket 126. In such embodiments, the inner fairing end 122, inner pocket 126, and seal 234 may be configured as shown in FIG. 16, with the seal arm 250 extending radially inward toward the inner lip 206 rather than radially outward toward the outer lip 208, i.e., when used as an inner seal 234, the seal 234 will be flipped or rotated about the circumferential direction C from the view provided in FIG. 16.

Referring to FIG. 17, a radial cross-section view is provided of a portion of an outer pocket 128 of outer band 104 and outer end 124 of fairing 106 illustrating another exemplary embodiment of a seal between the fairing 106 and outer band 104. As shown in FIG. 17, a seal 252 may be clipped on or otherwise attached to the outer lip 208 rather than the fairing outer end 124 as shown in FIG. 16 such that the seal 252 is positioned between the fairing outer end 124 and the outer pocket 128 of the outer band 104. More particularly, the seal 252 defines a channel 254 into which the lip 208 of the outer pocket 128 is received. An arm 256 of the channel 254 extends along each of an inner surface 258 and an outer surface 260 of the lip 208. Further, the inner arm 256 of the seal 252 functions as a wear portion of the seal 252, defining a planar wear surface 262 that may be positioned against the outermost surface 232 of the fairing 106. That is, the wear surface 262 of the seal 252 is between the outer end 124 of the fairing 106 and the outer band 104 such that the fairing 106 may rub or slide against, or otherwise contact, the seal 252 rather than the outer band 104, thereby helping prevent wear between the fairing 106 and outer band 104 in the area of the outer pocket 128.

In addition, like the seals 220 and 234 shown in FIGS. 15 and 16, the seal 252 includes a seal arm 264 that is compressed between the outer end 124 of the fairing 106 and the outer band 104. More specifically, the seal arm 264 extends between the radial surface 224 of the outer pocket 128 and the sides 114, 116 of the fairing 106. The radial surface 225 may define a recess 225 such that the seal arm 264 extends radially within the recess 225. Further, the seal arm 264 is curved such that it has a generally C-shaped or U-shaped cross-section. In the exemplary embodiment illustrated in FIG. 17, the seal arm 264 projects from the inner channel arm 256 along the radial surface 224 and curves toward the outer end 124 of the fairing until the seal arm 264 contacts the side 114, 116 of the fairing 106; it will be appreciated that the seal 252 and seal arm 264 extend about the fairing outer end 124 such that one portion of the seal arm 264 contacts the pressure side 114 and the remaining portion contacts the suction side 116. Accordingly, the seal 234 is configured to allow for axial and circumferential thermal growth of the outer band 102, fairing 106, seal 252, and/or components surrounding and/or supporting the fairing assembly 100, while also providing a seal and wear protection between the fairing 106 and outer pocket 128.

It will be understood that a plurality of seals 252 may be provided for the fairing assembly 100. One seal 252 of the plurality of seals 252 may extend around the lip 208 of each outer pocket 128 such that the seal 252 is between the outer pocket 128 and the outer end 124 of the fairing 106 received within the outer pocket 128. Further, seals 252 also may be used between the inner end 122 of the fairing 106 and the inner pocket 126. In such embodiments, the inner fairing end 122, inner pocket 126, and seal 252 may be configured substantially as shown in FIG. 17.

Turning now to FIGS. 18A, 18B, and 19, features for pinning the fairing airfoils 106 in the fairing assembly 100 will be described. As illustrated in FIGS. 18A and 18B, a pin 266 having a retention member 268 may be inserted into an aperture 270 in each fairing 106. More particularly, a first end 270 of a pin 266 may be inserted into an aperture 272 on each side 114, 116 of each fairing 106. In embodiments in which the fairing 106 is split into forward and aft sections 180, 182, the pins 266 may help hold the sections 180, 182 together, as illustrated in FIG. 18B. Referring to FIG. 19, the apertures 272 may be defined in the inner end 122 of each fairing 106 such that the pins 266 pin the fairings 106 to the inner band 102. The inner band 102 defines a groove 274 in which a second end 276 of each pin 266 is received. As shown in FIG. 19, the pinned fairings 106 may be best suited for use with the fairing assemblies 100 utilizing an inner band 102 and inner ring 154, e.g., as described with respect to FIGS. 6A-10. In such embodiments, the inner band 102 may be positioned within the engine 10, then the fairings 106 having pins 266 inserted into apertures 272 therein may be installed such that the fairing inner ends 122 are received in the inner pocket aft segments 156 and the pin second ends 276 are received in the groove 274. The inner ring 154 may then be maneuvered into position to enclose the fairing inner ends 122 in inner pockets 126 (the forward segments 158 of which are defined by the inner ring 154) and close the groove 274 such that the pin second ends 276 are retained in the groove 274. The retention member 268 helps retain the pins 266 in the apertures 272 and minimize circumferential movement of the pins 266.

In alternative embodiments, the groove 274 may be defined in the inner ring 154 rather than the inner band 102 (with the assembly method altered as needed to properly assemble such configuration) such that the pin second ends 276 are received in the inner ring 154 rather than the inner band 102. In still other embodiments, the groove 274 may be defined in part by the inner band 102 and in part by the inner ring 154 such that the pin second ends 276 are secured between the inner band 102 and inner ring 154. Even further, in some embodiments the fairings 106 may be pinned at the outer ends 124 rather than the inner ends 122, with the apertures 272 being defined in the fairing outer ends 124 and the groove 274 (or, as appropriate, apertures for receipt of the pin second ends 276) being defined in the outer band 104.

As further illustrated in FIG. 19, a seal may extend around each of the inner end 122 and outer end 124 of the fairing 106. In some embodiments, the inner seal 278 may be a wire seal or the like having a round cross-sectional shape, and the outer seal 280 may be a piston seal or the like having a square cross-sectional shape. The square cross-section seal 280 may be suitable for planar geometry, which may exist at the outer ends 124, while the round cross-section seal 278 may be suitable for a more complex geometry, which may exist at the inner ends 122. Of course, any suitable seal may be used, including the exemplary seals 220, 234, 252 described with respect to FIGS. 15-17.

FIGS. 20A, 20B, and 21-24 provide schematic cross-section views of various grommet and fastener configurations according to exemplary embodiments of the present subject matter. The grommet and fastener configurations, e.g., may be used to secure portions of the fairing assembly 100 to one another, within the engine 10, etc. Referring to FIGS. 20A and 20B, a grommet configuration is provided, which may be used in a blind or non-through hole, e.g., to line the hole and thereby protect the component in which the hole is defined. More particularly, a non-through hole 282 may be defined in a component, e.g., the forward portion 148 of the outer band 104 as shown in FIGS. 2A and 2B, and the hole 282 may be machined such that it tapers outward along its side 284 near its closed distal end 286. That is, as shown in FIG. 20A, the cross-section of the hole 282 is larger near the closed distal end 286 than near its open proximal end 288. A grommet 290 having an angled end 292 is inserted into the hole 282 with the angled end 292 angling inward, i.e., toward an axial centerline 294 of the grommet 290. A tool 296 may be inserted into the grommet 290 to push the angled end 292 outward as shown in FIG. 20B, such that the angled end 292 flares or angles outward after insertion of the tool 296 and fits within the tapered portion, i.e., distal end 286, of the hole 282. It will be appreciated that, in other embodiments, the angled grommet 290 may be used to hold two components together rather than merely lining the hole 282, e.g., to protect the component defining the hole 282. Further, rather than using a tool 296 to push or flare out the angled end 292 of the grommet 290, a fastener such as a screw, bolt, pin, or the like may be inserted into the grommet 290 to push or flare out the grommet angled end 292.

Turning to FIGS. 21 and 22, in some embodiments, multiple grommets and a pin may be used to secure two components to one another. As shown in FIG. 21, a grommet 298 may be inserted and secured into the non-through hole 282 in a first component 300 and a swaged grommet 302 may be attached in an opening 304 of a second component 306; the second component 306 is being coupled to the first component 300. A pin 308 having a head 310 is inserted into the opening 312 defined by the grommets 298, 302, and the pin 308 may be welded to the swaged grommet 302. As shown in FIG. 22, rather than inserting the grommet 298 in a non-through hole such as hole 282, the grommet 298 may be secured in a through hole 314. Further, a headless pin 316 may be used to couple the first and second components 300, 306, and the grommet 298 may include a bottom portion 318 to prevent the pin 316 from slipping through the opening 312 defined by the grommets 298, 302. Further, the pin 316 may be welded to the grommet 302 to secure the pin 316 in place.

Referring now to FIG. 23, a flared insert or grommet 320 may be used in the first component 300. More specifically, the grommet 320 is flared outward at its distal end 322, such that the distal end 322 has a larger cross-section than a body 324 of the grommet 320, and the hole 282 or 314 in which the grommet 320 is received is likewise flared or angled to receive the grommet distal end 322. The grommet 320 may include an anti-rotation feature 326, such as a collar or the like that seats in the first component 300, at a proximal end 328 of the grommet 320 to prevent the grommet 320 from rotating within the hole 282 or 314 in which the grommet 320 is secured. A fastener 330, such as a pin or bolt, may be inserted through the second component 306 and into the grommet 320 to secure the first and second components 300, 306 together. Further, a washer 332 may be used, e.g., to prevent wear between the fastener 330 and the second component 306.

FIG. 24 illustrates another embodiment of a grommet and fastener configuration for securing two components to one another. In the embodiment of FIG. 24, the grommet 320 extends within both the first component 300 and the second component 306. As shown in FIG. 23, the grommet 320 includes a flared distal end 322 that is received within a flared hole 282 or 314 in the first component 300. The body 324 of the grommet 320 extends through the second component 306, and the proximal end 328 may be swaged around the fastener 330 to retain the fastener in the grommet 320. In other embodiments, the fastener 330 may be welded to the grommet 320, in addition to or as an alternative to swaging the grommet proximal end 328.

FIG. 25 provides a flow diagram illustrating a method 2500 for assembling a fairing assembly 100 in a gas turbine engine, such as turbofan engine 10, according to an exemplary embodiment of the present subject matter. The method 2500 includes installing an annular, single piece inner band 102 in the gas turbine engine, as shown at 2510. The inner band 102 defines a plurality of inner pockets 126 as described herein, and the method 2500 includes, as shown at 2520, inserting an inner end 122 of each of a plurality of fairings 106 into an inner pocket 126 of the plurality of inner pockets 126. Next, as illustrated at 2530, the method 2500 includes sliding an annular, single piece outer band 104 into position with respect to the plurality of fairings 106 such than an outer end 124 of each of the plurality of fairings 106 is received in an outer pocket 128 of a plurality of outer pockets 128 defined by the outer band 104. In exemplary embodiments, the outer band 104 slides into position from a forward end 110 of the fairing assembly 100 toward an aft end 112 of the assembly 100. Optionally, method 2500 also may include securing the fairings 106 to one or both of the inner band 102 and outer band 104 via pins, bolts, brazing, bonding, or any other suitable attachment means. For example, the fairings 106 may be secured to the inner band 102 and/or outer band 104 once the outer band 104 is in position with respect to the fairings 106.

Method 2500 may be used to assemble the fairing assembly 100 as described with respect to FIGS. 2A-5 with a turbine frame having a bolted frame design, although method 2500 may be used with other frame designs as well. In embodiments in which the fairing assembly is used with a bolted turbine frame, the method 2500 may further include installing the struts 108 through the inner band 102, outer band 104, and fairings 106 of the fairing assembly 100, as shown at 2540, although a strut 108 need not extend through every fairing 106. Next, as illustrated at 2550 and 2560, the struts 108 are secured to the inner hub 140 and the outer case 146, e.g., by bolting the struts 108 to the hub 140 and case 146. As depicted in FIG. 2A, the fairing assembly 100 may be pinned at the outer side of its forward end 110, and thus, the method 2500 includes at 2570 inserting at least one pin 144 through the outer case 146 and into an opening 152 in the outer band 104. The opening 152 may be a blind hole as described herein. The method 2500 also may include steps for securing the pin 144 with respect to the fairing assembly 100. Further, as illustrated in FIG. 2B, the fairing assembly 100 also may be pinned at the inner side of its forward end 110, such that the method 2500 includes at 2570 inserting at least one pin 138 through the inner hub 140 and into an opening 150 in the inner band 102 to pin the fairing assembly 100 on its inner side as well as its outer side.

Other exemplary assembly methods also are provided. FIG. 26 provides a flow diagram illustrating a method 2600 for assembling a fairing assembly 100 in a gas turbine engine, such as turbofan engine 10, according to another exemplary embodiment of the present subject matter. The method 2600 includes, as shown at 2610, installing one fairing 106 of a plurality of fairings 106 over each strut 108 of the turbine frame. Then, the method 2600 comprises installing an annular, single piece outer band 104 in the gas turbine engine, as shown at 2620. The outer band 104 defines a plurality of outer pockets 128 as described herein, and the method 2600 includes, as shown at 2630, inserting an outer end 124 of each of a plurality of fairings 106 into an outer pocket 128 of the plurality of outer pockets 128. Next, as illustrated at 2640, the method 2600 includes sliding an annular, single piece inner band 102 into position with respect to the plurality of fairings 106 such that the inner end 122 of each of the plurality of fairings 106 is received in an inner pocket aft segment 156 of a plurality of inner pocket aft segments 156 defined by the inner band 102.

Then, as shown at 2650, the method 2600 comprises positioning an inner ring 154 at a forward edge 160 of the inner band 102. As described herein, the two pieces, inner band 102 and inner ring 154, of the fairing assembly 100 allow the fairing assembly 100 to be installed around the turbine frame. The inner pocket aft segments 156 of the inner band 102 form open inner pockets 126, i.e., pockets that are open at a forward end 130 and closed at an aft end 132, and the inner ring 154 is positioned at the forward edge 160 of the inner band 102 to close the forward ends 130. As described herein, the inner ring 154 defines a plurality of inner pocket forward segments 158, and together the inner pocket forward segments 158 and inner pocket aft segments 156 define the inner pockets 126 that encircle the inner ends 122 of the plurality of fairings 106. The method 2600 further may include, as shown at 2660, joining the inner ring 154 to the inner band 102, e.g., fastening an inner ring flange 164 to an inner band flange 162 with suitable fasteners 170. Optionally, method 2600 also may include securing the fairings 106 to one or both of the inner band 102 and outer band 104 via pins, bolts, brazing, bonding, or any other suitable attachment means. For example, the fairings 106 may be secured to the inner band 102 and/or outer band 104 once the inner band 102 is in position with respect to the fairings 106. Method 2600 may be used to assemble the fairing assembly 100 as described with respect to FIGS. 6A-8 with a turbine frame having a two-piece frame design, but method 2600 may be used with other frame designs as well.

FIG. 27 provides a flow diagram illustrating a method 2700 for assembling a fairing assembly 100 in a gas turbine engine, such as turbofan engine 10, according to yet another exemplary embodiment of the present subject matter. Method 2700 may be utilized to assemble the fairing assembly 100 as described with respect to FIGS. 9-13 with a turbine frame having a single or one-piece frame design, although method 2700 also may be used with other frame designs. As such, the method 2700 includes installing the inner band 102, outer band 104, and fairings 106 around the turbine frame. Accordingly, the open inner and outer pockets 126, 128 configuration may be utilized, where the inner ring 154 and outer ring 172 are provided to close the inner and outer pockets 126, 128.

Referring to FIG. 27, as shown at 2710, the method 2700 includes installing an annular, single piece outer band 104 in the gas turbine engine. The outer band 104 defines a plurality of outer pockets 128 as described herein. Next, as illustrated at 2720, the method 2700 includes positioning the outer ring 172 at the forward flange 174 of the outer band 104, as shown at 2720, and joining the outer ring 172 to the outer band 104, as depicted at 2730. Thus, the two pieces, outer band 104 and outer ring 172, of the outer portion of the fairing assembly 100 are installed around the turbine frame.

Then, as illustrated at 2740, a plurality of first fairing sections may be assembled with a plurality of second fairing sections to form a plurality of fairings 106. As described with respect to FIGS. 12 and 13, the first and second fairing sections may be forward and aft sections 180, 182 or first side and second side sections 188, 190 of a split fairing 106. The fairings 106 are split such that they may be installed around struts 108 and/or other components of the single piece turbine frame. After the first and section fairing sections are assembled to form the fairings 106, each fairing 106 is slid into an outer pocket 128 defined in the outer band 104, as shown at 2750.

The method 2700 also includes sliding an annular, single piece inner band 102 into position with respect to the assembled fairings 106, as shown at 2760. The inner band 102 defines a plurality of inner pockets 126. Next, the method 2700 includes positioning the inner ring 154 at the forward edge 160 of the inner band 102, as shown at 2770, and joining or fastening the inner ring 154 to the inner band 102, as shown at 2780. Therefore, the two pieces, inner band 102 and inner ring 154, of the inner portion of the fairing assembly 100 are installed around the turbine frame. As described herein, the inner ring 154 closes the inner pockets 126 and the outer ring 172 closes the outer pockets 128. The inner ring 154 may be fastened to the inner band 102 using any appropriate fastener, and the outer ring 172 may be joined to the outer band 104, e.g., by pinning the outer ring 172 to the outer band 104. Optionally, method 2700 also may include securing the fairings 106 to one or both of the inner band 102 and outer band 104 via pins, bolts, brazing, bonding, or any other suitable attachment means. For example, the fairings 106 may be secured to the inner band 102 and/or outer band 104 once the inner band 102 is in position with respect to the fairings 106.

Further, as described herein, the inner band 102, outer band 104, and fairings 106 may be formed from a CMC material. It will be appreciated that the inner ring 154 and outer ring 172 also may be formed from a CMC or other suitable composite and that the split fairings 106 may be formed from a CMC or other composite. However, the inner band 102, outer band 104, fairings 106, inner ring 154, and/or outer ring 172 also may be formed from any suitable material. Specific processing techniques and parameters for forming the components of the fairing assembly 100 will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. Other techniques for forming CMC components include polymer infiltration and pyrolysis (PIP) and oxide/oxide processes. Components may also be fabricated from a carbon fiber reinforced silicon carbide matrix (C/SiC) CMC, which is processed using chemical vapor infiltration.

Still further, in some embodiments, one or more components of the fairing assembly 100 may be formed using a suitable additive manufacturing technique or process, such as Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner to a DMLS or DMLM process. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

Moreover, the additive manufacturing processes disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, a CMC component process as described herein, and/or any other suitable manufacturing process. Indeed, any suitable combination of materials and manufacturing methods may be used to form these components.

Accordingly, the embodiments described above provide a variety of benefits. For instance, the embodiments of the fairing assembly described herein utilize single piece inner and outer bands, which reduce leakage and pressure losses, as well as part count, manufacturing complexity, and manufacturing cost. Further, the split fairing assembly as described herein is adapted for use with a variety of turbine frame configurations, including a single piece frame. Enabling use of the single piece turbine frame allows a reduced frame weight and reduced frame cost. Moreover, the fairing assembly embodiments described herein may be formed from a CMC material, which has a reduced weight and increased temperature capability compared with other fairing assemblies. In addition, separating the fairing airfoils from the bands allows for relative thermal expansion, which reduces thermal stress in the fairing assembly and allows the design to be more defect tolerant. Thus, the above described embodiments result in commercial advantages such as reduced frame aerodynamic losses and manufacturing costs and allow for increased operating temperatures and efficiency. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A fairing assembly for a gas turbine engine, comprising:
a plurality of fairings, each fairing having an inner end radially spaced apart from an outer end, each fairing extending axially from a leading edge to a trailing edge;
an annular inner band defining a plurality of inner pockets, each inner pocket shaped complementary to the inner end of each fairing, each inner pocket having a forward end and an aft end;
an annular outer band defining a plurality of outer pockets, each outer pocket shaped complementary to the outer end of each fairing, each outer pocket having a forward end and an aft end;
a non-through hole defined in a component of the fairing assembly, the non-through hole tapering outward along its side near its closed distal end; and
an angled grommet inserted in the non-through hole, the angled grommet having an angled end fitting within the tapered distal end of the non-through hole,
wherein the inner band is a single piece structure,
wherein the outer band is a single piece structure, and
wherein the inner end of each fairing is received within an inner pocket of the plurality of inner pockets and the outer end of each fairing is received within an outer pocket of the plurality of outer pockets.

2. The fairing assembly of claim 1, wherein the inner band surrounds each inner pocket such that each inner pocket is closed at the forward end and the aft end.

3. The fairing assembly of claim 1, wherein the outer band surrounds each outer pocket such that each outer pocket is closed at the forward end and the aft end.

4. The fairing assembly of claim 1, wherein each inner pocket is open at the forward end and closed at the aft end.

5. The fairing assembly of claim 4, further comprising:
an inner ring positioned against a forward edge of the inner band to close the forward end of each inner pocket.

6. The fairing assembly of claim 4, wherein each outer pocket is open at the forward end and closed at the aft end.

7. The fairing assembly of claim 6, further comprising:
an outer ring positioned at a forward flange of the outer band to close the forward end of each outer pocket.

8. The fairing assembly of claim 1, wherein the plurality of fairings, the inner band, and the outer band are each formed from a ceramic matrix composite material.

9. The fairing assembly of claim 1, further comprising:
a second non-through hole defined in a second component of the fairing assembly; and
an opening defined in a third component,
wherein a flared grommet is secured in the second non-through hole and the opening,
wherein the flared grommet has a distal end with a larger cross-section than a body of the flared grommet,
wherein the body of the flared grommet extends through the opening, and
wherein a proximal end of the flared grommet is swaged around a fastener inserted in the flared grommet to retain the fastener with respect to the flared grommet.

10. A fairing assembly for a gas turbine engine, comprising:
a plurality of fairings, each fairing having an inner end radially spaced apart from an outer end, each fairing extending axially from a leading edge to a trailing edge;
an inner ring defining a plurality of inner pocket forward segments;
an annular inner band defining a plurality of inner pocket aft segments, the inner ring positioned against a forward edge of the inner band such that the inner pocket forward segments and inner pocket aft segments form a plurality of inner pockets, each inner pocket shaped complementary to the inner end of each fairing, each inner pocket having a forward end and an aft end;
an annular outer band defining a plurality of outer pockets, each outer pocket shaped complementary to the outer end of each fairing, each outer pocket having a forward end and an aft end;
a non-through hole defined in a first component;
a grommet secured in the non-through hole;
an opening defined in a second component;
a swaged grommet secured in the opening; and
a pin inserted into an opening defined by the grommet and the swaged grommet,
wherein the pin is welded to the swaged grommet,
wherein the inner ring is a single piece structure,
wherein the inner band is a single piece structure,
wherein the outer band is a single piece structure, and
wherein the inner end of each fairing is received within an inner pocket of the plurality of inner pockets and the outer end of each fairing is received within an outer pocket of the plurality of outer pockets.

11. The fairing assembly of claim 10, further comprising:
an outer ring,
wherein the outer ring is a single piece structure,
wherein each outer pocket is open at the forward end and closed at the aft end, and
wherein the outer ring is positioned at a forward flange of the outer band to close the forward end of each outer pocket.

12. The fairing assembly of claim 10, wherein at least one fairing is split axially and comprises a forward section and an aft section.

13. The fairing assembly of claim 10, wherein at least one fairing is split circumferentially and comprises a first side section and a second side section.

14. The fairing assembly of claim 10, wherein each inner pocket comprises a lip that extends about the inner pocket, and wherein the inner end of each fairing is received within an inner pocket such that the inner end contacts the lip.

15. The fairing assembly of claim 10, wherein each outer pocket comprises a lip that extends about the outer pocket, and wherein the outer end of each fairing is received within an outer pocket such that the outer end contacts the lip.

16. The fairing assembly of claim 10, further comprising:
a plurality of seals,
wherein a seal of the plurality of seals is positioned between the outer end of each fairing and the outer band,
wherein each seal of the plurality of seals comprises a curved arm that is compressed between the outer end of the fairing and the outer band, and
wherein each seal of the plurality of seals comprises at least one planar wear surface between the outer end of the fairing and the outer band.

17. The fairing assembly of claim 10, further comprising:
a plurality of seals,
wherein a seal of the plurality of seals is positioned between the inner end of each fairing and the inner band,
wherein each seal of the plurality of seals comprises a curved arm that is compressed between the inner end of the fairing and the inner band, and
wherein each seal of the plurality of seals comprises at least one planar wear surface between the inner end of the fairing and the inner band.

18. The fairing assembly of claim 10, wherein the plurality of fairings are pinned at the inner end of each fairing with a plurality of pins, each pin of the plurality of pins extending between the inner end of one fairing of the plurality of fairings and the inner band.

19. The fairing assembly of claim 10, wherein the plurality of fairings, the inner band, and the outer band are each formed from a ceramic matrix composite material.

20. The fairing assembly of claim 10, further comprising:
a second non-through hole defined in a component of the fairing assembly, the second non-through hole tapering outward along its side near its closed distal end; and
an angled grommet inserted in the second non-through hole, the angled grommet having an angled end fitting within the tapered distal end of the second non-through hole.

21. The fairing assembly of claim 10, wherein the grommet is a flared grommet that has a distal end with a larger cross-section than a body of the grommet.

22. A method for assembling a fairing assembly in a gas turbine engine, the method comprising:
installing an annular inner band in the gas turbine engine, the inner band defining a plurality of inner pockets;
inserting an inner end of each of a plurality of fairings into an inner pocket of the plurality of inner pockets;
sliding an annular outer band into position with respect to the plurality of fairings such than an outer end of each of the plurality of fairings is received in an outer pocket of a plurality of outer pockets defined by the outer band,
defining a non-through hole in a component of the fairing assembly; and
securing a grommet in the non-through hole,
wherein the grommet is a flared grommet that has a distal end with a larger cross-section than a body of the grommet,
defining an opening in a second component,
securing a swaged grommet in the opening,
inserting a pin into an opening defined by the grommet and the swaged grommet, and
welding a pin to the swaged grommet,
wherein the inner band is a single piece structure, and
wherein the outer band is a single piece structure.

23. The method of claim 22, wherein the outer band slides into position from a forward end of the fairing assembly toward an aft end of the fairing assembly.

* * * * *